(12) United States Patent
Brown et al.

(10) Patent No.: US 6,385,652 B1
(45) Date of Patent: May 7, 2002

(54) CUSTOMER ACCESS SOLUTIONS ARCHITECTURE

(75) Inventors: Kenneth R. Brown, Babylon; John D'Onofrio, Staten Island, both of NY (US); James Ellerbee, Hillsdale, NJ (US); Jay Gould, Medford; Jennifer Holme, New York, both of NY (US); Peter J. Lupario, Easton, CT (US); Umesh Marthi, Jersey City, NJ (US)

(73) Assignee: Citibank, N.A., New York, NY (US)

( * ) Notice: Subject to any disclaimer, the term of this patent is extended or adjusted under 35 U.S.C. 154(b) by 0 days.

(21) Appl. No.: 09/292,854

(22) Filed: Apr. 16, 1999

Related U.S. Application Data
(60) Provisional application No. 60/081,965, filed on Apr. 16, 1998.

(51) Int. Cl.[7] ............................................. G06F 13/00
(52) U.S. Cl. ..................... 709/227; 709/203; 709/223; 709/218; 705/42; 902/24; 717/11
(58) Field of Search .................... 709/217, 218, 709/219, 227, 203, 223; 705/42, 43; 902/24; 717/11

(56) References Cited

U.S. PATENT DOCUMENTS

| | | | |
|---|---|---|---|
| 5,544,320 A | * 8/1996 | Konrad | 709/203 |
| 5,671,279 A | 9/1997 | Elgamal | 705/79 |
| 5,729,594 A | 3/1998 | Klingman | 379/93.12 |
| 5,905,248 A | 5/1999 | Russell et al. | 235/462.01 |
| 5,987,430 A | * 11/1999 | Van Horne et al. | 705/34 |
| 6,075,863 A | * 6/2000 | Krishnan et al. | 713/191 |
| 6,128,601 A | * 10/2000 | Van Horne et al. | 705/34 |
| 6,233,604 B1 | * 5/2001 | Van Horne et al. | 709/203 |

OTHER PUBLICATIONS

International Preliminary Examination Report on International Application No. PCT/US99/06530, dated Apr. 16, 1999, submitted by the International Preliminary Examining Authority on Aug. 23, 2000.
Written Opinion dated Feb. 25, 2000, published by the PCT International Preliminary Examining Authority for International Application PCT/99/06530 dated Apr. 16, 1999.
International Search Report dated Jul. 7, 1999.
Article: NetBill: An Internet Commerce System Optimized for Network–Delivered Services (IEEE Personal Communications, Aug. 1995).
Article: Internet—The Future Delivery Channel for Banking Services? (1060–3425/98).
Article: Economic Aspects of Electronic Commerce in Financial Services and Advantageous Steps to Extended Offers in Internet Banking (1060–4325/98).

* cited by examiner

Primary Examiner—Kenneth R. Coulter
(74) Attorney, Agent, or Firm—Kilpatrick Stockton LLP; George T. Marcou

(57) ABSTRACT

The present invention provides systems and methods for electronically delivering banking services to end clients and, more particularly, using Internet based technologies as a means of exposing those services. The solution to this problem set forth in this invention is the creation of a common electronic delivery infrastructure and application deployment environment, exposing an institution's entire portfolio of corporate banking services to its clients at a number of different locations at any time.

23 Claims, 28 Drawing Sheets

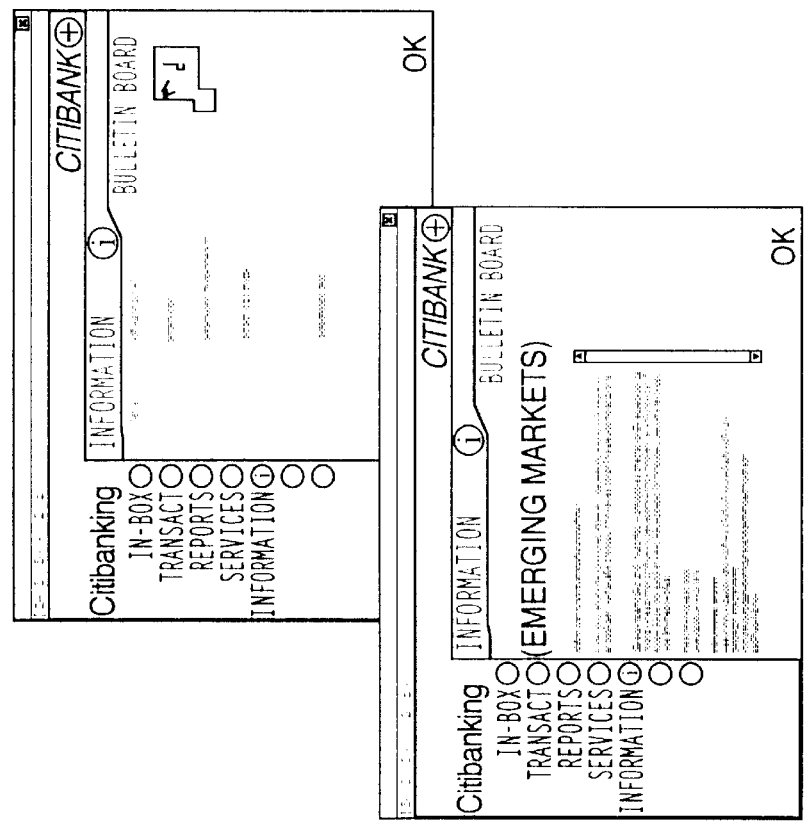
FIG. 11
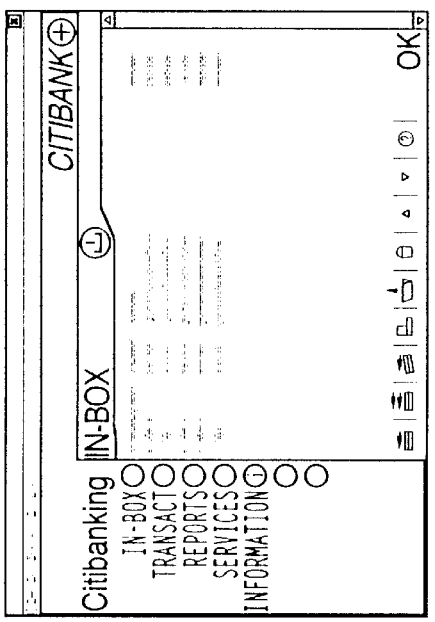
INBOX

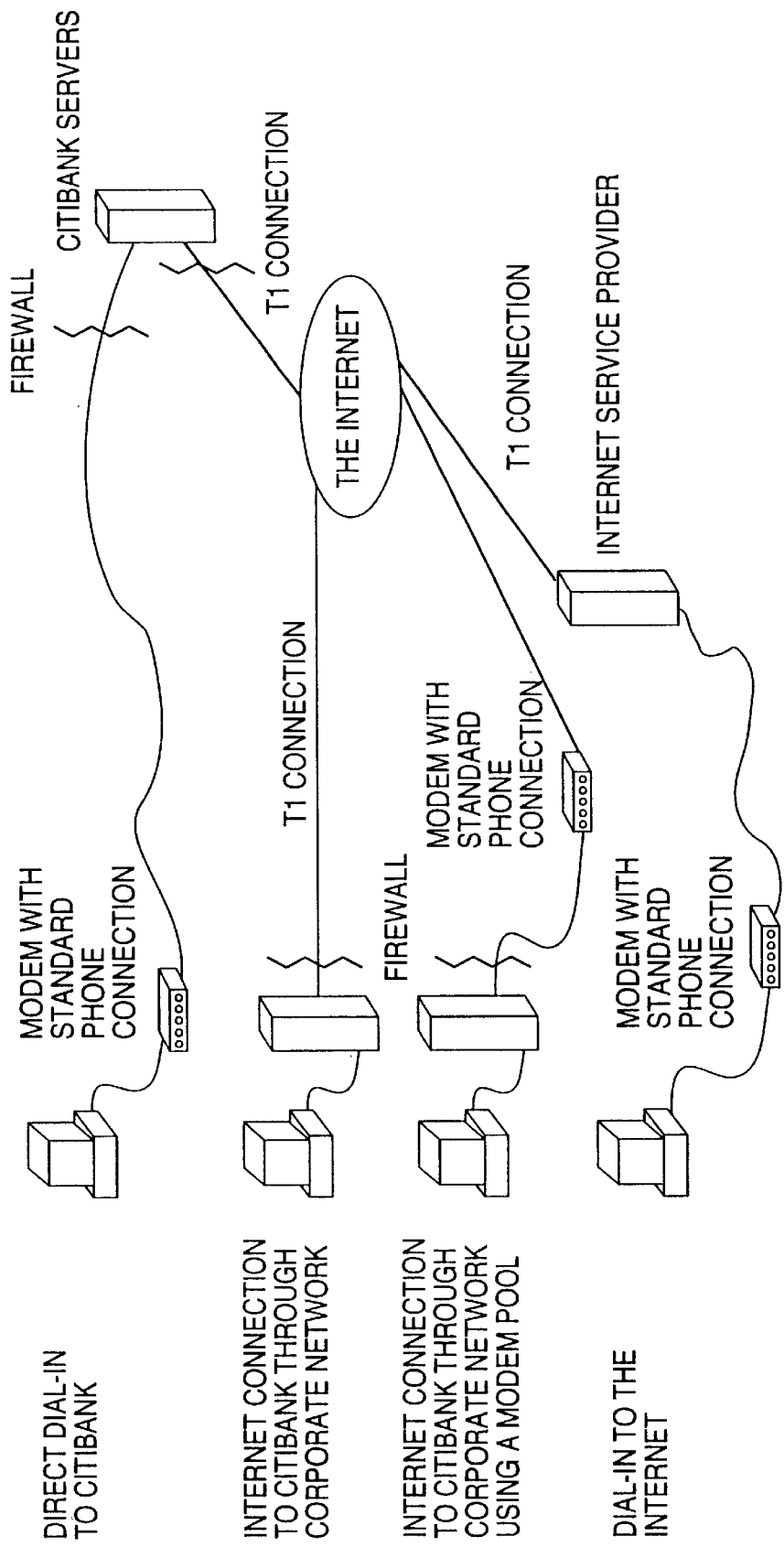

CUSTOMER ACCESS SOLUTIONS ARCHITECTURE

This application claims the benefit of U.S. Provisional Application No. 60/081,965, titled "CUSTOMER ACCESS SOLUTIONS ARCHITECTURE", which was filed Apr. 16, 1998.

FIELD OF THE INVENTION

This invention relates to the field of banking services and, in particular, the field of electronic banking services delivery within the corporate banking arena. More particularly, this invention comprises an electronic delivery infrastructure and applications deployment environment supporting direct end-customer personal computer (PC) access to the full range of corporate banking services. The infrastructure may be accessed either directly over a network, such as the Internet, via extranet direct dial-in or via other private network access methods using standard internet technologies.

BACKGROUND

International businesses involved in global operations need electronic access to financial services. Their reasons include operational imperatives to have instantaneous access to consolidated information, the global nature of the world's economies, the inter-dependencies between products and services in one region and another, and the price competitiveness between global entities, the sheer growth and trajectory of information capabilities makes electronic global access to services an axiom. Today's international businesses clearly understand that they have a need to not only be "globally present" but also "globally aware." For institutions, such as international money-center banks, whose business it is to deliver global corporate banking services, effective and efficient electronic delivery is core to their existence.

Developing an effective and efficient electronic delivery of corporate banking services has been a challenge for the industry. From 1975 to 1998, there have been several efforts at developing electronic banking services. Most have been either single product in orientation, single region, and limiting in the technology's ability to meet even basic needs. In the mid 1970s to the early 1980s, many of the systems were based upon the concept of terminal emulation. In the middle 1980s disk operating system (DOS) workstations became popular, then in the latter 1980s to early 1990s, the technology further shifted from mainframe central processing unit-to-central processing unit (CPU-to-CPU) communications to Windows® Workstations with proprietary software loaded on the end-client's machines. All of these, while delivering some measure of functionality, fell far short of the needs as a platform and infrastructure to keep pace with the business needs. What's worse is that many of these systems still remain today and incur substantial infrastructure, maintenance, and support costs associated with their continued use. In addition, traditional prior art computer systems have several deficiencies that need to be addressed, including the following:

Existing computer systems have high operating costs. Deployment costs are also extremely high. Deployment requires site visits by electronic banking teams, and support costs are also high for software installed on customer sites—especially for supporting numerous customer operating environments/local area networks (LANs). Software updates often require the dispatch of bank technicians to each customer site for the installation. Existing systems also typically have inferior security, including unreliable hardware-based security solutions. Many systems are not compliant with the latest corporate security standards.

Another problem with the prior art is fragmented product delivery. Many customers have multiple systems in their offices, and each system is specifically focused on delivery of a single product. Platforms capable of integrating across products are rare at best. There are also problems with existing systems because they require extensive time to market. Time-to-market is key to competition, and a one year lead time on new capabilities development is typically needed. The development process requires integration with full release and deployment of new services gated by implementation capability (2–3 months lead time and growing).

Existing systems also have high cost to market. The current per site cost deployment/support for these systems is too high for profitable delivery to new market segments, and this is especially true for third-world emerging markets. Further, the infrastructures of these systems are typically inflexible, and institutions are unable to deliver new products (e.g., image delivery) to customers with existing infrastructures. Another problem with existing systems is that they typically only address generic electronic banking services. Large software systems often lack personalization and customization from the perspective of banking customers, and electronic banking services available to each particular customer need to be tailored to meet the preference and need of each customer. For instance, a small, domestic company may use its bank strictly for paying bills, accounts receivable and payroll. The company would not have a need for any international transactions and would preferably avoid these selections in the interest of saving time.

There is thus a need for a system and method to overcome the problems of the prior art.

SUMMARY OF THE INVENTION

In order to overcome the problems of the prior art, as well as other problems, it is an advantage of the present invention to provide a system and method for electronically delivering banking services to end clients and, more particularly, using network, such as Internet based technologies for delivering such services.

It is a further advantage of the present invention to provide a common electronic delivery infrastructure and application deployment environment capable of delivering an institution's entire portfolio of corporate banking services to its clients at any time.

It is a further advantage of the present invention to provide an electronic delivery infrastructure and applications deployment environment supporting direct end-customer personal computer (PC) access to a full range of corporate banking services. Such infrastructure may be accessed either directly over a network, such as the Internet, via extranet direct dial-in or via other private network access methods using standard internet technologies.

It is a further advantage of the present invention to provide support for multiple access methods, depending on customer requirements.

It is a further advantage of the present invention to provide use of non-proprietary network (e.g., Internet) enabled devices (e.g., Web browsers) for accessing business applications.

It is a further advantage of the present invention to provide direct commercial integration with customer processes and systems.

It is a further advantage of the present invention to provide global data warehouse for information.

It is a further advantage of the present invention to provide software-based security for encryption and authentication and hardware-based token cards for user access.

It is a further advantage of the present invention to provide dial-up or through client networks It is yet a further advantage of the present invention to provide a system and method for transferring data from a remote data entry device, such as that contained in a cellular telephone or a portable computer equipped with a modem, to a receiving station capable of receiving the data transmitted from the remote data entry device via cellular network, satellite, or other wireless communication systems. Data transfer from the receiving station to the remote data entry device is also contemplated.

It is a further advantage of the present invention to provide a system and method for remote and portable command transmission to a receiving station that is capable of performing tasks in response to data and commands transmitted from a remote data entry device.

It is a further advantage of the present invention to provide an apparatus capable of carrying out the methods of the present invention. It is a further advantage for the apparatus to include a data entry device capable of transmitting via a cellular network, satellite, or other wireless communication systems, and the data entry device to include capability for encrypting data or commands entered on the data entry device and capable of transmitting signals that may be received and decrypted by the receiving station into commands capable of being performed by the receiving station.

In accordance with the present invention there is provided a system and method for an electronic delivery of infrastructure and applications deployment environment that provides efficient means for delivering an institution's portfolio of corporate banking services to its clients at anytime. This invention is useful for example, for banking services and, in particular, the field of electronic banking services delivery within the corporate banking arena. The invention includes features that resolve issues presented by prior technology solutions, including the following. The present invention lowers operating costs and improves quality. The invention requires no client visits to install and/or upgrade software, and client-side support is eliminated. The invention improves time and cost to market, as well as facilitates client acquisition. The invention is network centric and therefore facilitates rapid product development, as well as system introduction. The structure of the architecture also eliminates the need for release dependencies.

The invention increases security and reliability, applying both software and hardware based security. The invention also provides users with personalization and customization of services and features available on the system software for consistent look and feel and user-friendly electronic banking services. The invention also improves competitive positioning by providing a single platform for integrated delivery.

The present invention thus provides a method and system for electronically delivering banking services to end clients and, more particularly, using network, such as Internet, based technologies for delivering such services. In particular, the invention relates to a method and system that includes a common electronic delivery infrastructure and application deployment environment capable of delivering an institution's entire portfolio of corporate banking services to its clients at any time.

To achieve the stated and other objects of the present invention, as embodied and described below, the invention includes a method for providing services over a network from a host to an access location, comprising: providing a plurality of services, the plurality of services accessible by the host; receiving a request for access to the plurality of services from the access location via the network; and installing a local access application at the access location; wherein the plurality of services are accessible at the access location via the local access application and via the host.

To achieve the stated and other objects of the present invention, as embodied and described below, the invention includes a system for providing services over a network, comprising: a host server coupled to the network; a processor accessible by the server, the processor providing a plurality of services; an access program operable over the network; and a local access location coupled to the network; wherein the plurality of services are accessible at the access location via the local access application and via the host. The system may include an infrastructure that comprises: directory of business services and solution packaging, custom menu creator, inbox, user and client preferences, flow control and entitlements, reusable user interface components, local client persistence, business service interface, common reference data, context-sensitive help, transaction monitor, security features, error handling, scalability and load balancing model, and system metrics and monitoring.

Additionally, capabilities that are provided by the method and system of the present invention may include, not exclusively, payments, netting, and reporting. The payments capability can provide connectivity by MCP or branches, and it can provide support for payment funding, autofunding via OLR, spot contracts. Additionally, the payments capability allows a single point of entry for all payments and may include such instruments as global funds transfers, book transfers, paylink check, paylink GIRO, worldlink factory. It also allows multiple input modes, such as detail entry of information or quick entry via predefined parameters set up by the method or system user, which includes both the host institution and its customers.

The netting capability may provide: transaction initiation with multiple instruments and multiple entry modes, netting processes such as run netting and generating payments, linkage to payments service, integration with no-CASA delivery protocols.

The reporting capability may include: reporting framework, payments reports derived on the payments capability, netting reports derived from the netting capability, balance and transaction reports, and inquiries about balance and transaction, trade, foreign exchange, investments, etc.

Additional objects, advantages and novel features of the invention will be set forth in part in the description that follows, and in part will become more apparent to those skilled in that upon examination of the following; these features may also be learned by practice of the invention.

BRIEF DESCRIPTION OF THE FIGURES

In the figures:

FIG. 11 shows an example of the graphical user interface representing the CASA inbox;

FIG. 14b shows a detailed view of the CASA architectural constructs of FIG. 14a;

FIG. 19 shows various means a client can access the CASA system in accordance to one embodiment of the present invention.

DETAILED DESCRIPTION

Figure 1:
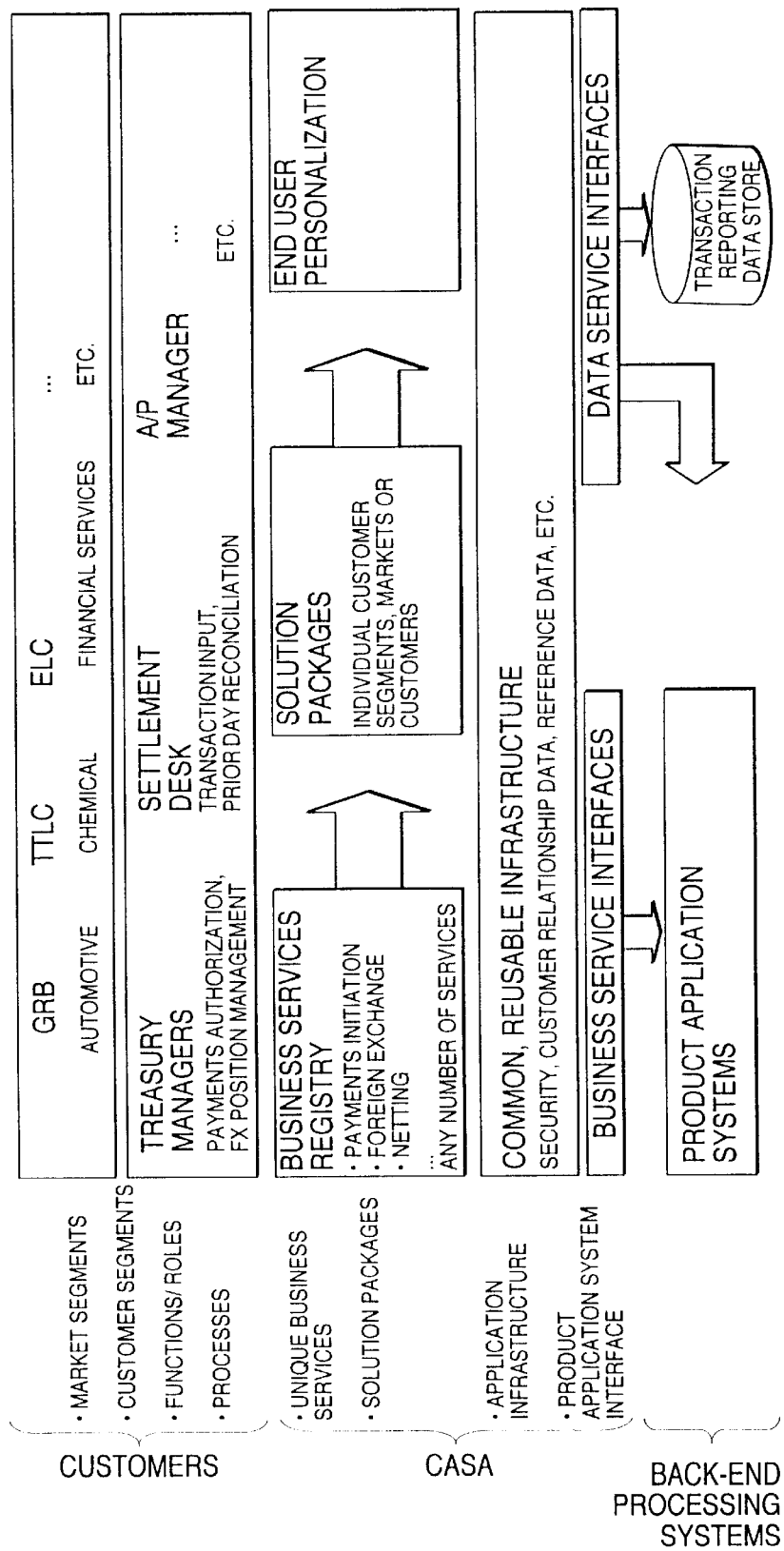
FIG. 1 shows a general overview of possible services that a host institution can offer to its customers through the CASA system.

The present invention relates to a customer access solutions architecture (CASA) system for electronic banking services that is achieved through the integration of a comprehensive infrastructure and a series of applications. The infrastructure provides flexibility to the CASA system for future application upgrades and add-ons; thus, it comprises architectural components or frameworks to which modifications can be made to the system without the need to redesign the entire system. FIG. 1 shows a general relational overview of some of the services that a host institution can offer to its customers through the CASA system.

An embodiment of the present invention may be illustrated by overviewing example installation and uses by a customer, as will now be described. An embodiment of the present invention includes customer software on the customer (client) machine that has been made resident using, for example, an applet, such as a Java program. In one embodiment, the resident software for the customer is installed using specialized software on a client machine that synchronizes automatically with the host system. In this embodiment, when the customer connects, for example, via a network such as the internet, the host machine, such as a server, recognizes the identity of the customer after performing security checks.

The host system then determines at the start of each customer or client session, among other things, what version of the software is resident to the client and what objects the customer prefers on their machine. The host system then determines whether any software needs to be updated. Updating can occur, for example, if the host institution decides to upgrade software and provide new functionality. To perform this upgrade, the host system may further determine, for example, whether the customer already has sufficient local capability to take advantage of that functionality or whether the customer must be provided with additional software or other capabilities to enhance the customer's ability to take advantage of any new functionality contained in the update.

In an embodiment of the present invention, such updating and other functions performed using the synchronized software are transparent to the customer and are completed automatically. This automatically synchronizing aspect of the present invention provides an improvement over the prior art updating, such as updating that involves customer by customer site-specific visits and updates, in that, with the present invention, new software may be developed and implemented at all customer locations immediately, even if there are, for example, 150,000 customers. Thus, for example, the host institution can immediately market a new product to customers without having to physically go to the customer and install new software. Further, this feature of the present invention provides the advantage that the time to market—in terms of the time from conception of a product to the product being designed, built, tested, and then turned over to the customer—is reduced because the difficulties associated with installation and training are removed or greatly reduced.

According to an embodiment of the present invention, the host functions and applications to which the customer is entitled, as well as particular features to which the customer is dynamically entitled, are also continually maintained on a customer-specific basis. As a result, the system automatically ensures, for example, that the customer doesn't receive information or updates the customer is not entitled to have. Because this feature is simple to update, functions and applications to which the customer is entitled can be dynamically changed, such as when negotiated with the sales or marketing branch of the host institution.

For use with the present invention, a CASA customer is represented by a client entity, which is an organization of an account group, a service group, and users. The client entity is identified by a client entity name, description, and a unique identifier. The client entity account access rights are defined by the account group, and the client entity service access rights are defined by the service group, which is defined by the solution packages and other individual services assigned to the client entity. Additionally, the client entity is enabled to create users organized into entitlement groups, which are granted certain access privileges to the accounts and services belonging to the client entity. Thus, to the users, the service group is a combined superset of all services to which the users may be entitled. For example, if the CASA customer is a company which has different departments and a number of employees within each department, each department or even each employee within each department could be designated as a user and provided with entitlement to different functions and applications. According to one embodiment of the present invention, the functions and applications to which users are entitled are services in the solution packages that are assigned to the client entity. In this embodiment, the number of solution packages that may be provided to a client entity or customer varies as these solutions packages are developed and made available by the host institution.

According to an embodiment of the present invention, other applications used by the client entity or customer that are external to the present invention may also be integrated with the system of the present invention. For example, if the customer has standard software that the customer uses for general ledger processing and other functions, such as payroll, the present invention provides a capability to interface that standard software with the business solutions of the present invention. This interfacing is initially provided on a customer and software specific basis and may be updated or other interaction may occur in a similar manner to how system software updates occur. According to an embodiment of the present invention, the interfacing may include translating, such as converting data from one format to another format. This translating may occur, for example, using third party translation software.

According to an embodiment of the present invention, the customer interface for the present invention includes the capability for the customer to select parameters and preferences to allow the customer to customize, for example, the desktop that provides the user interface to the host system. For example, business applications provided to the customer may be listed in a menu, and the customer may rename the menu items to names with which the customer is more comfortable. The customer may also, for example, place the menu items into folders and name those folders at their own convenience.

Further, the customer may, for example, customize the menu based on any criterion supported, such as time of the week. Thus, for example, the customer may create a Monday folder and have applications that are applicable for Monday operations, have a Tuesday folder and have applications that are applicable to Tuesday operations—and the customer may name those applications differently for personal convenience so that the desktop will look slightly different for the customer on each day. The customer could then, for example, have a reset button that allows the customer to switch from the customer-specific name for a function and how it was organized back to a standard name and organization. The functions still work the same, but the customer has, for example, the ability to drag and drop. Further, for example, there may be functions to which the customer has access, but that the customer never uses and that clutters up the menu; the customer can remove such functions from being displayed.

In an embodiment of the present invention, the customer may also select other preferences, such as the language in which functions and applications are displayed and operate. Thus, for example, a Chinese customer may view applications in Chinese, a French customer in French, a Russian in Cyrillic, a Malaysian in Malay. The present invention provides a preference code so that the customer can select to see, for example, the labels, the error messages, and, where possible, the data in the preference language is for that customer.

An embodiment of the present invention also includes security features for both hardware and software that are tailored to the customer. According to one embodiment, not only is the physical machine authenticated, but also the sending customer. This authentication is accomplished using, for example, a trust certificate, which authenticates both parties (the customer and the host institution) mutually and allows both parties to identify themselves. Authentication can include a password and a physical piece of equipment, such as an interface card.

In order to accomplish the above described functions, as well as other, the architecture of an embodiment of the present invention is organized into a plurality of hierarchical levels. One layer of this architecture allows for identification of the location of the user accessing the system or the location at which a particular process is being performed. Once the location has been identified, the system can then determine the protocol under which such location is operating and communicate with that location in its own native protocol. Thus, exchanges between the remote user and the system are relatively error free because both locations operate on the same protocol.

In addition, the system software is written so as to accept totally new software. This is possible via the system software's standard interface. The system has a predefined interface that is used to interact with other software systems. By standardizing this interface, newly written code at the user level need only be written to exchange data and commands via this interface. This prevents the need of rewriting the system software whenever a user wants to add new software to a client computer.

Various aspects and system components of the present invention will now be described in conjunction with description of the accompanying figures.

Figure 2:
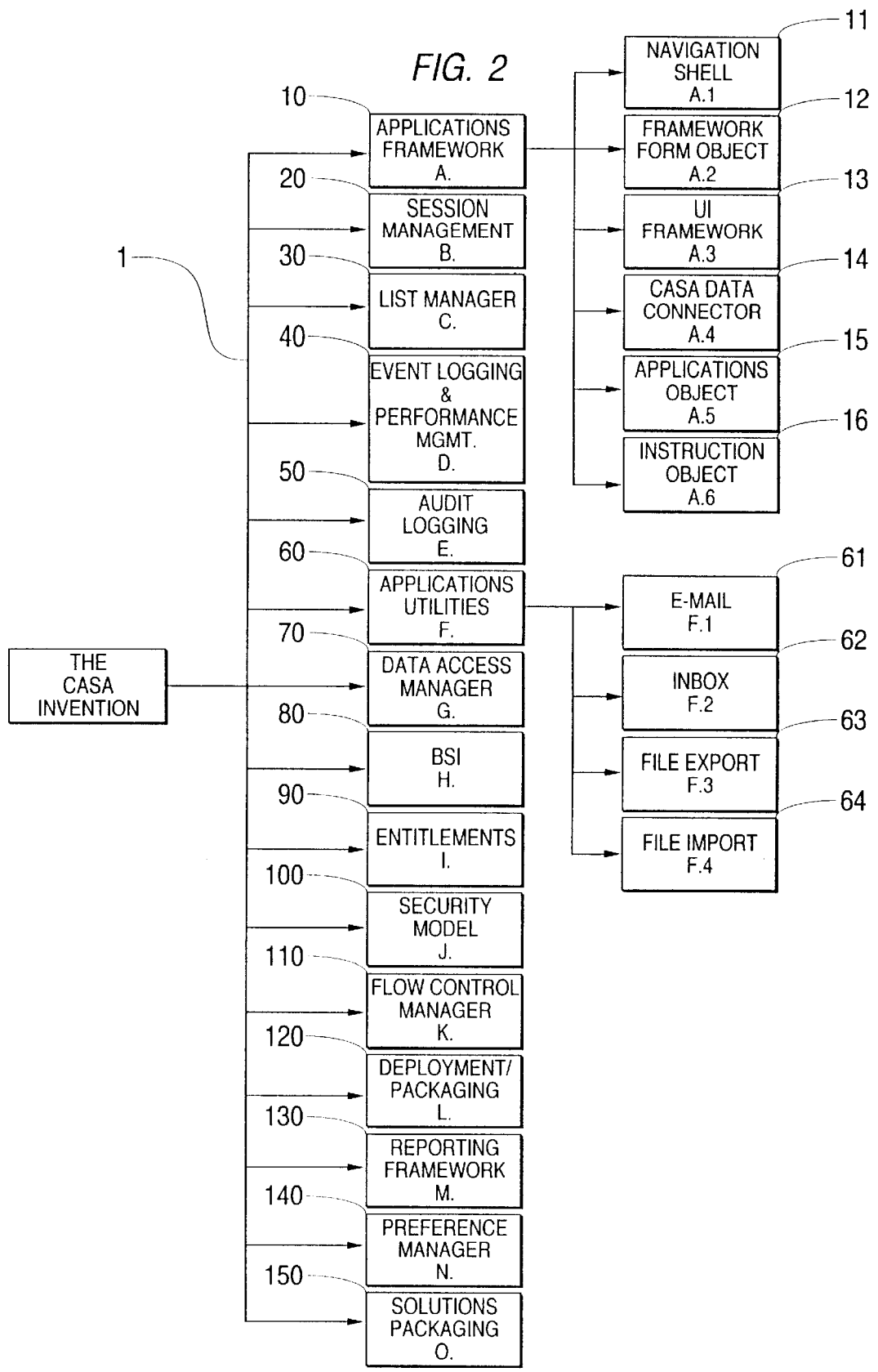
FIG. 2 shows a high-level view of the basic components of the CASA system in accordance with an embodiment of the present invention.

FIG. 2 provides a high-level view of the CASA comprehensive infrastructure according to one embodiment of the present invention. The comprehensive infrastructure comprises the following architectural components: an applications framework 10 that supports rapid applications development; a session manager 20 which manages the life-time of a user session; a facility called a list manager 30 which manages the retrieval of generic list data; a facility for providing an abstraction between persisted data and the application called the data access manager 70; a facility which provides an abstraction between product servicing applications and the delivery application; in an embodiment of the present invention, this abstraction is referred to as the business services interface 80; a facility for reporting called the reporting framework 130; a preference manager 140, which provides support for handling and managing user preferences; an infrastructure for event handling and performance management 40; robust audit logging facilities 50; facility for managing interchanges between common system components, which, in an embodiment of the present invention is referred to as the flow control manager 110; a robust security manager 100 supporting both hardware and flexible software implementations; an entitlements manager 90 for controlling user access to sensitive information; a facility for packaging and representing products called the business services directory or solutions packaging 150; and a host of common application utilities 60 including inbox support 62, file import/exports 64 and 63 and e-mail 61.

The CASA electronic delivery infrastructure and applications deployment environment disclosed herein provide for highly efficient and effective means for exposing an institution's entire portfolio of corporate banking services to its clients, anytime, anywhere and anyplace. Each of the above components is described in greater detail below.

Referring to FIG. 2, the applications framework 10 is a large portion of the system of an embodiment of the present invention. This framework is the core of the application in this embodiment and is particularly constructed to provide reusable elements that can and should be applied across all applications and products. In one embodiment of the present invention, the CASA applications framework includes a set of Java programs residing on both the client side and the server side that work together to simplify the development of CASA applications. The framework 10 handles all the internal processing required to send data back and forth between client and server and provides a consistent error handling model. In an embodiment of the present invention, the framework further incorporates such entities as a navigation shell 11, form objects 12, user interface framework 13, data connector 14, applications object 15 and instruction object 16.

The navigation shell 11 is, for example, a Java applet that occupies the entire client area of the browser and is the place where business applications forms are displayed and made available. All application forms are implemented as Java applets and/or HTML components, and the navigation shell design specifies that they are presented as panels and uniform resource locators (URLs). The shell is customizable (e.g., selection of solution packages, dynamic re-sizing of the form area) and data driven, and provides an interface for new forms and applications to be inserted.

In one embodiment, navigation in CASA includes two basic components—site navigation and application navigation. Site navigation is performed through the site menu, which is a standard navigation menu implemented by panels and URLs developed from the navigation shell 11. Application navigation takes place in the forms that belong to the application. Overall, the CASA navigation is organized as follows: the site navigation (menu) includes service categories and service classes within the service category, as filtered by the entitlement management, which will be described later; the application navigation includes forms for each service class and actions required within the forms. Together, the site navigation and the application navigation provide a hierarchical structure for the standard navigation menu as shown in FIG. 3.

Figure 3:
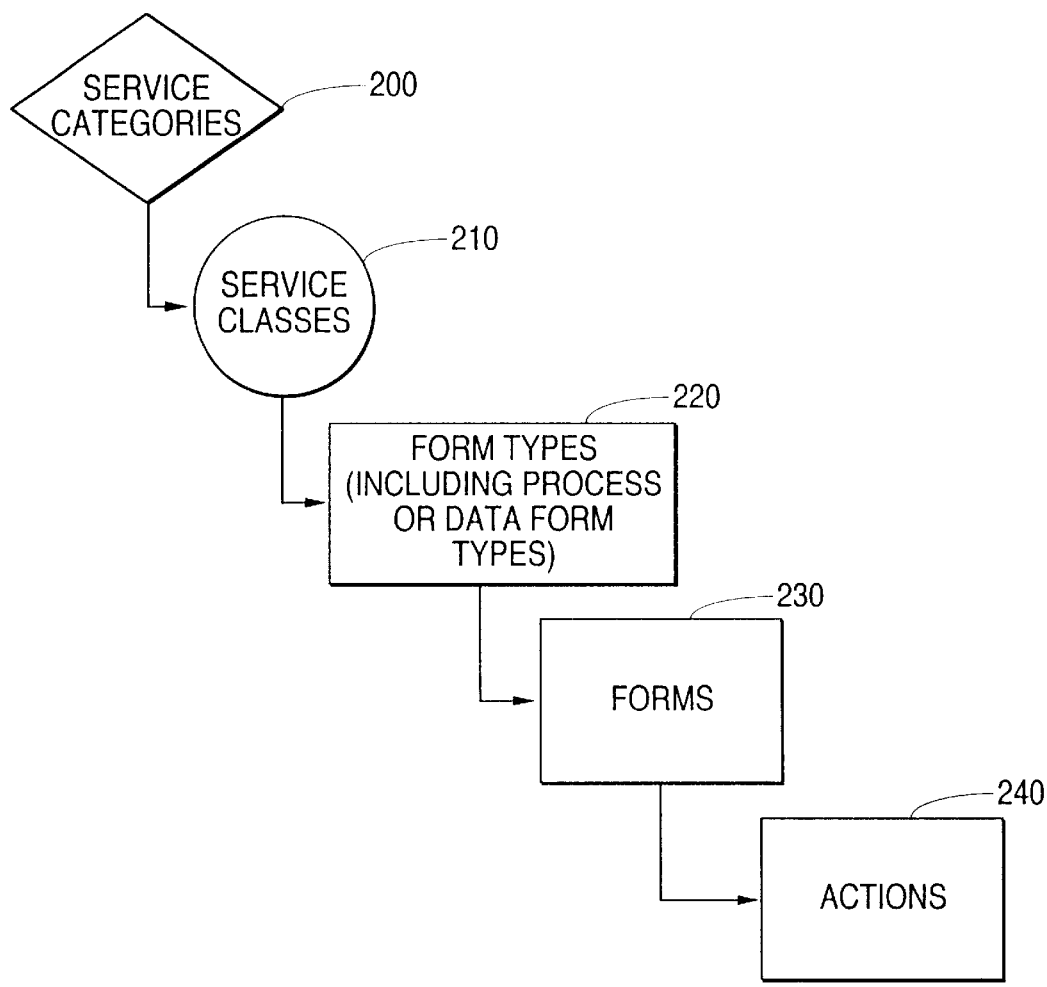
FIG. 3 shows a standard user navigation menu for the CASA system in accordance to an embodiment of the present invention.

Referring to FIG. 3, a client user would first have access to the service categories 200 on the menu. Each service being offered by an institution to its clients, for example, belongs to a single service category, which represents the most general definition of its service; for example: transact, report, etc. There may be one or more service categories in a solution package or the directory of services that are offered to the clients, based on client desires and needs. Each service further belongs to a service class that is found under a service category. Service classes 210 are defined by like processes, data, and business purpose, and there may be one or more classes per service category.

Belonging to each service class are the form types 220. They allow data entry to support transactional activity related to that class. Form types are by nature similar in that they are used for similar business purposes, and require the processes associated with their class. They can be process form types, which are used to support the processing of other forms in the class, or data form types, which typically contain similar data. Each form type in a class has one or more actual forms 230 associated with it. This allows for different versions of the form type, as may be required by a client's business. Furthermore, within each form there are one or more actions 240 to be performed by the client user.

Figure 4:
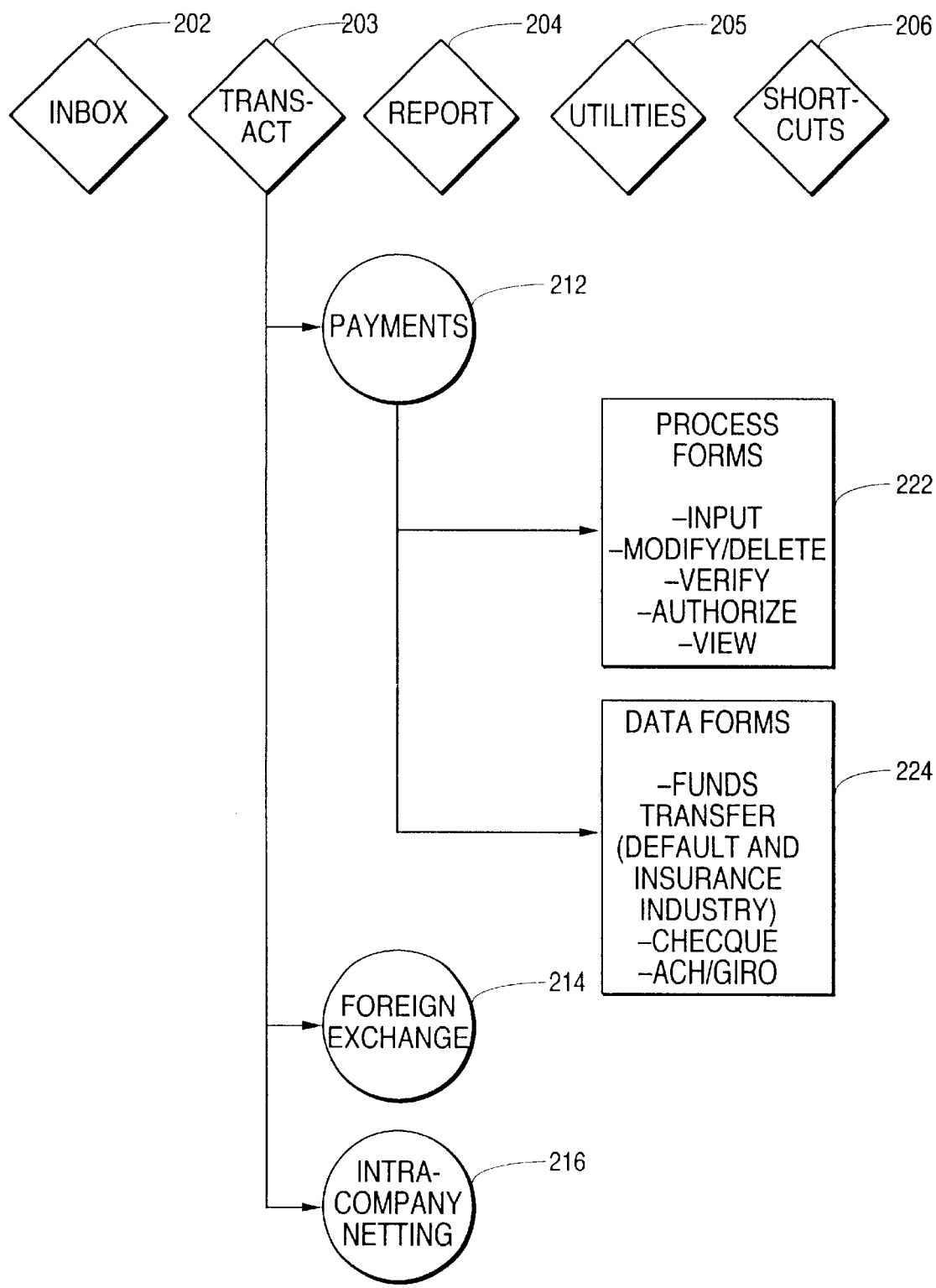
FIG. 4 also shows the user navigation menu and incorporates detailed services available to the user in accordance to an embodiment of the present invention.

FIG. 4 shows a more detailed embodiment of the navigation menu in accordance to an embodiment of the present invention. The service categories may include such options as inbox 202, transact 203, report 204, utilities 205, and shortcuts 206. Each service category may have its own service classes. For example, under the transact service category, there are service classes such as payments 212, foreign exchange 214, and intra-company or inter-companies netting 216. Each service class, in turn, would include process form type 222 and data form type 224. The process form type typically includes such processing forms as input, modify/delete, verify, authorize, and view for processes associated with its class. Whereas the data form type typically includes form types that contain similar data. What distinguishes between the form types here is that they typically represent a different method for a similar function. For example, under the payments service class, there are form types called fund transfers and cheques. They are both used to make payments, but they utilize different methods (electronic versus paper) and as a result, also have slightly different data requirements—hence, they are different types of the same thing—a payment.

Furthermore, for example, under the fund transfer form type, there may be two versions of the actual form—funds transfer default, and funds transfer insurance industry. The latter version would be used to create a funds transfer, but it might use data naming conventions that differ from the default funds transfer form, or might require industry specific data be captured as part of the payment (perhaps through its own sub-form). Other specific features of the application framework in FIG. 3 according to an embodiment of the present invention will now be described.

The form objects 12 (FIG. 2) are created and manipulated by the navigation shell 11 to generate the necessary application forms in the navigation menu. They are thus the entry points into the applications framework 10. The data connector 14 represents a standard manner of passing data from the CASA client to the CASA servers. This connector is a network abstraction in CASA that handles the secure Hypertext Transport Protocol (HTTP) connection back to the CASA servers, and it is used by the applications framework 10 to send requests to. server-side application components.

The User Interface (UI) framework 13 (FIG. 2) is an extension of the CASA applications framework 10. The UI framework 13 is a form panel that automates the transfer of CASA field collections from the CASA field collection fields, which collect data for the requested view from the navigation shell's server components, to graphical user interface (GUI) form fields for use by the navigation shell 11 to generate the navigation menu. In addition to transfer, the UI framework 13 also formalizes and standardizes validations on fields, implementations model, view, and the controller paradigm that utilizes the CASA field collection. In essence, the UI framework ensures that services can be integrated into many solution packagings, that the services share the standard look and feel, and that development risk is minimized by establishing library of standard reusable UI components.

The applications object 16 provides the core server-side validation and business logic that controls the application. It is accessed by the navigation shell 11 via the form object 12 to generate an application form in the navigation menu. The applications object 16 also manages and determines the use of the instruction object 16. It is the key representation of the business case. The instruction object 16 is an abstract-base subclass of the application instructions, which extend the instruction class with required business logic for an instruction type. The responsibilities of the instruction object 16 include interfacing a data access layer (DAL) to provide persistence and automatic versioning and version checking of transactions based on the application instructions. The data access layer (DAL) provides an abstraction of the physical location and actual names of elements in the CASA database. The instruction object 16, via the DAL, interfaces with other components, such as the business systems interface (BSI) 80, flow control manager 110, audit logging 50, and entitlement services 90 to process those instructions. Thus, the instruction object 16 provides for consistent implementation of such components and a standard set of instructions such as modify, verify, and authorize. Other specific architectural components of the CASA infrastructure according to an embodiment of the present invention will now be described.

The session manager 20 manages user sessions and establishes security protocols for the client user. It also manages the life-time of a user session and provides the entry point into the Java domain. In an embodiment of the present invention, the session manager 20 is a C++ component that makes a call into the Java session object, which is a COM interface. The List Manager 30 provides generic access information to be presented in a list paradigm and provides a variety of methods with which to present information.

The event logging and performance management 40 includes an entire suite of software developed to identify and uniformly process error messages. This aspect of the invention includes a method by which error strings (e.g., text messages) can be mapped to a particular end-user's language. In an embodiment of the present invention, the event logging and performance management 40 is comprised of three core functions: system audit log, error logging and notification, and application metrics. The system audit log captures user activities on the system. The users here include both the clients and the banking personnel. Error logging and notification is used for problem notification, tracking, and resolution. This function insures that errors are reported to the client and recorded in an error log. It also provides an error trace facility to support customer problem resolution. Application metrics are statistics about system usage that are captured and stored to support various system analysis for purposes such as performance measurement, usage patterns, and electronic billing. Performance measurement is done to determine ease of use and system performance. This information is used to gauge the intuitiveness of the system interface, as well as system execution times. In addition to performance measurement, the system will also track the number of times a user accesses a particular form or function. This tracking information is used to identify users of particular features for various purposes, such as marketing, workflow analysis, design modifications, impact analysis, etc. Usage statistics may also be used for the purpose of customer billing. One such purpose may be a determination by the institution of the frequency in which CASA services have been used by customers in order to charge appropriate user fees.

Audit logging 50 is a service that is used uniformly by all applications of the present invention. Every event and key stroke is monitored, allowing one the ability to develop very customized and personalized applications targeted to meet the needs of specific clients. The typical audit record contains the complete state of the instruction before modification, and it also contains the complete state after modification.

The data access manager 70 is a generic means to abstract the details of the database implementation away from the application. In using this tool, changes can be made to the database (including replacing the database with another) and the DAL in a manner that can be made transparent to the application.

Figure 5:
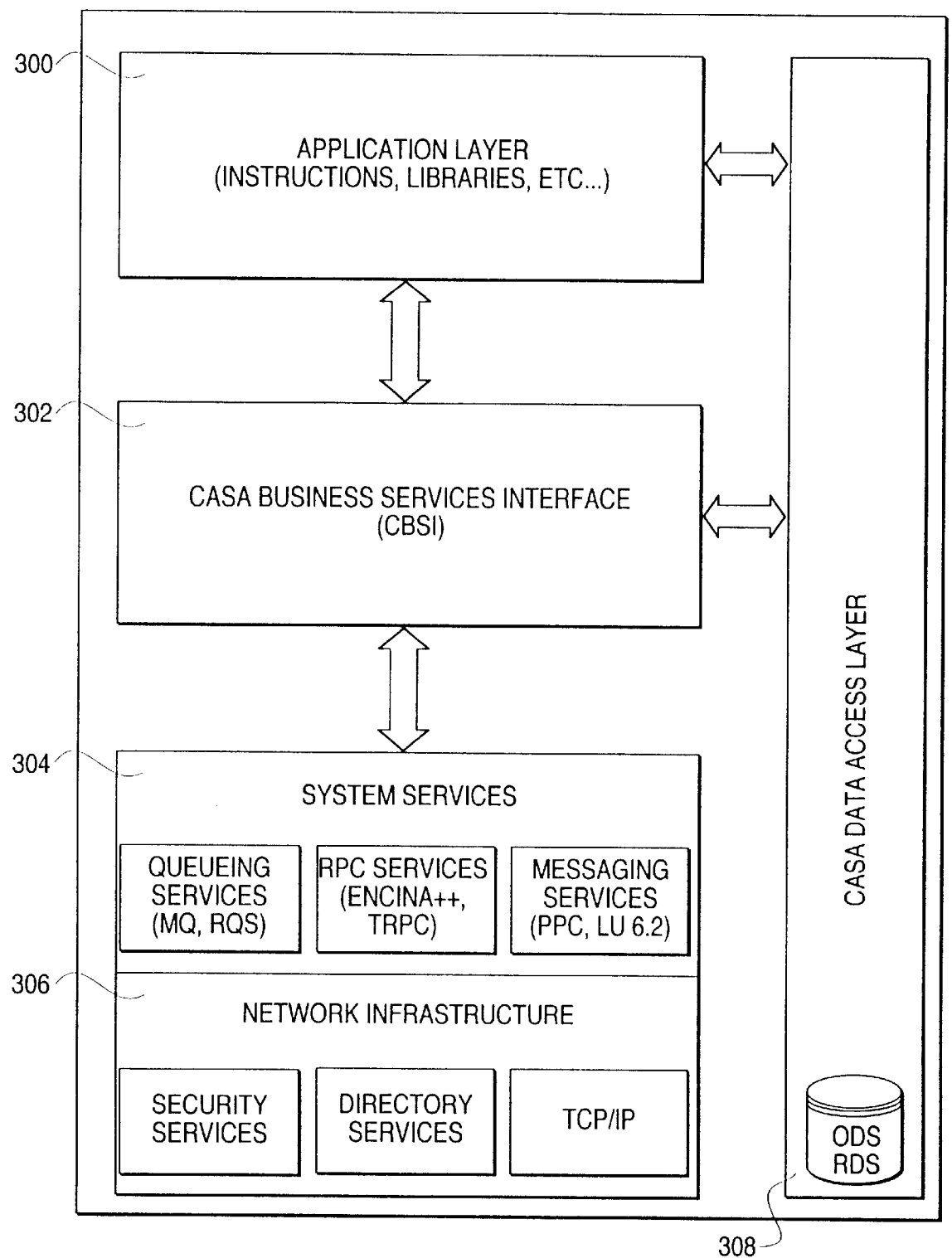
FIG. 5 shows a schematic diagram of the CASA system and incorporates the business services interface, thereby demonstrating the roles and functions played by the business services interface in the system.
Figure 6:
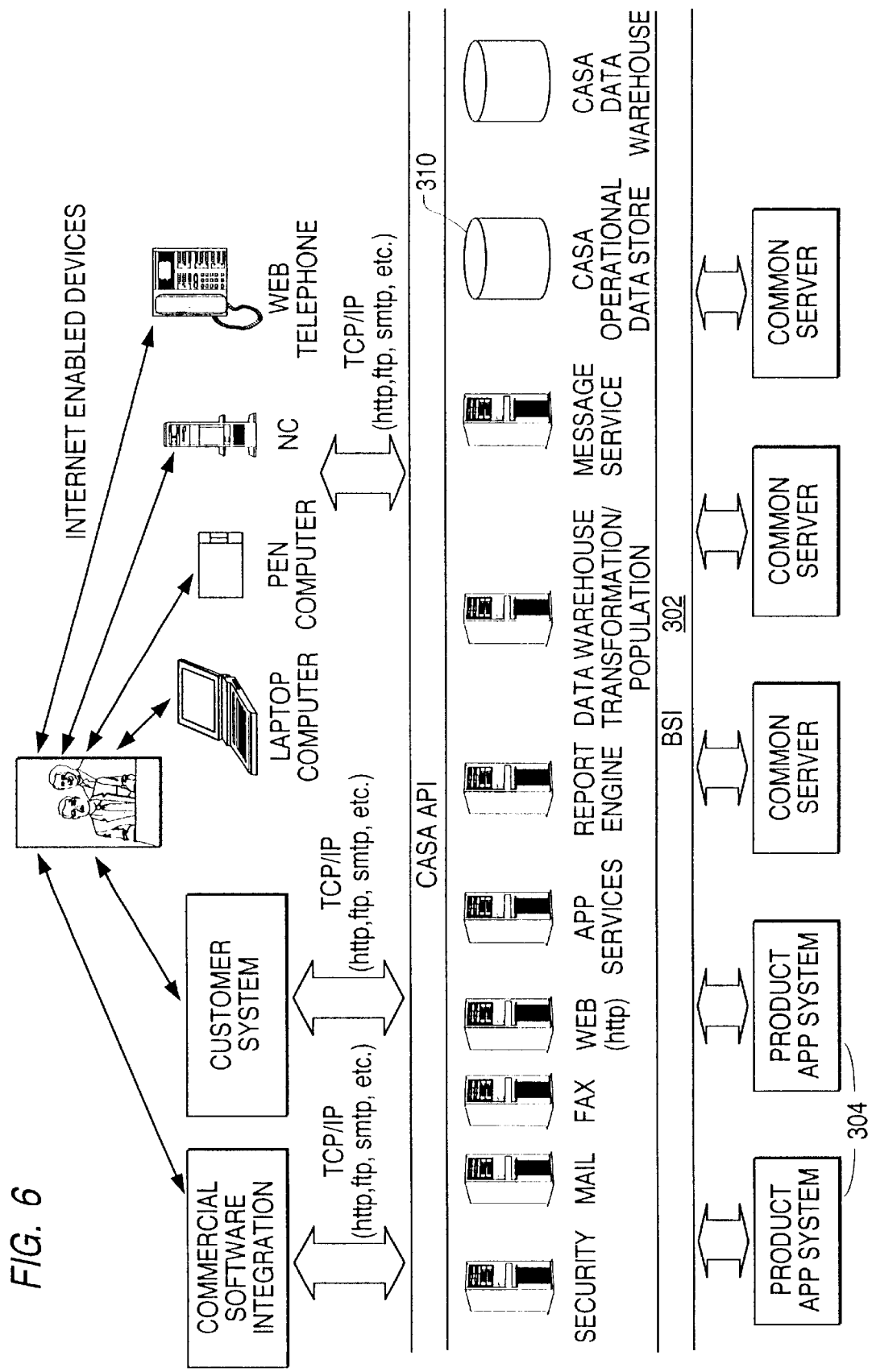
FIG. 6 shows an overview of the CASA system and also incorporates the business services interface.

Referring now to FIGS. 5 and 6, the BSI 302 provides an abstraction layer between the CASA applications and various product application systems (PAS) and common servers belonging to the CASA institution. In FIG. 5, the application layer 300 contains the business and data flow logic implemented by the CASA system. This includes, but not limited, to libraries and instructions objects. The BSI layer 302 encapsulates the PAS functionality 304 for the CASA application layer 300. It exposes a well-known interface that hides the physical location and formats of the data and the logic that implement functions needed by the application layer 300 if that function is supplied by a PAS 304. There is at least one BSI object for every PAS that CASA is connected to. In some cases there may be BSI objects which perform a routing function if a particular business function is serviced by more than one PAS.

As mentioned earlier, the DAL 308 encapsulates the physical implementation of the CASA database or data store. It exposes a well-know interface(s) that supplies all the necessary persistent data storage functions within the CASA system. The instructions, libraries and other application level objects would then use DAL objects to manage persistent data storage in the CASA Data Store (CDS) 310 and the CASA Business Systems Interface (BSI) objects to access the PAS functionality. Thus, the BSI provides a consistent interface to all PAS and common servers freeing the application instruction developer from all the intricacies in dealing with varying communication and interface protocols for each PAS and common server.

The Entitlement management 90 (FIG. 2) aspect of the present invention maintains the access control lists and permission information for business data and business functions. Business instructions use this service to determine the set of operations that a user is entitled to perform on an instruction in a given state, and the standard navigation menu is also filtered accordingly by user entitlement. Client users only see those classes to which they are entitled, and under a class in the application frame, they can only perform the processes to which they are entitled. For example, a user is entitled to the payments class and is entitled to perform input and authorize for the class. The navigation menu would then only show the payments class, and the application frame would only allows navigation to input and authorizes processing of forms.

The security manager 100 incorporates both hardware and software components. Components include the use of Data Encryption Standard (DES) Gold and Smartcard technologies, X.509 Certificates, Web Crusader with Entrust, Entrust Server components, Firewalls, and specially developed entitlements server and the application of the event logging manager.

Data encryption in accordance with an embodiment of the present invention may be performed by a number of commercially available circuits, which provide encryption according to the DES standards referred to above. In order to provide encryption capability, in an embodiment of the present invention, both the data entry device and the receiving unit include circuitry to allow encryption and decryption of the data and command signals.

The encryption aspects of the present invention address a number of problems with the prior art. Signal transmissions to remote locations via wireless or landline communication methods may be intercepted by unauthorized recipients or may activate or interfere with devices other than the device for which the instructions were intended. In fact, wireless and landline communication in general is susceptible to interception and use by those other than the intended recipients. Therefore, it has been desirable to encrypt or encode wireless communications. Existing systems typically have employed cryptoalgorithms, which operate to encrypt digital data into an unintelligible form for transmission over non-secure communications channels, such as commercial telephone lines. In 1977 the U.S. National Bureau of Standards published an encryption algorithm, or cryptoalgorithm, which is known as the DES. This cryptoalgorithm is the U.S. standard for the encryption of sensitive unclassified data and is used by federal agencies for the transmission of sensitive unclassified data, and by private companies in applications such as electronic funds transfer. The DES is published in Federal Information Processing Standards Publication 46 (FIPS PUB 46) of the National Technical Information service (1977), and in U.S. Pat. No. 3,796,830 to Smith and U.S. Pat. No. 3,798,359 to Feistel, which are hereby incorporated by reference.

An embodiment of the present invention incorporates use of the DES method of encryption, utilizing a data encryption key, which consists of a multi-bit binary word, such as the 64 bit word used in the original DES standard. The key is used as a variable element in a publicly known mathematical algorithm that converts digital data into an apparently random sequence of bits. The same key must be known to both the sender and the receiver because the key is required to decrypt the encrypted data by the standard DES decryption procedure. Since both the encryption and decryption procedures are publicly known, the security of the key is crucial to the effective use of the DES. DES users typically change keys at frequent intervals. For example, federal agencies using the keys provided by the National Security Agency typically change keys on a daily basis.

There are now available commercial devices which implement the DES encryption/decryption procedure, which are also compatible with embodiments of the present invention. Such devices are in the form of integrated circuits, which accept as one input the data to be encrypted and as another input a key. Additionally, the commercially available DES devices typically have a capability for receiving the encrypted data as a third input in a feedback mode. This is known as cipher feedback, and operates to prevent the transmission of repetitive sequences of encrypted data when the data being encrypted contains repetitive sequences of identical characters.

The flow control manager 110 is a common component of the system which is used by the instruction object and library objects to impose a designated workflow based upon a set of fields sourced from an instruction or library object. Flow controls are set at the Client Entity level. They are not applied at the Entitlement Group or any other level. Therefore, any flows established are always established at, and apply to, a specific client entity. As stated earlier, the client entity is an organization of an account group, a service group, and users. It represents a CASA customer, and it is identified by a Client Entity Name, Description, and a unique Identifier.

Figure 7:
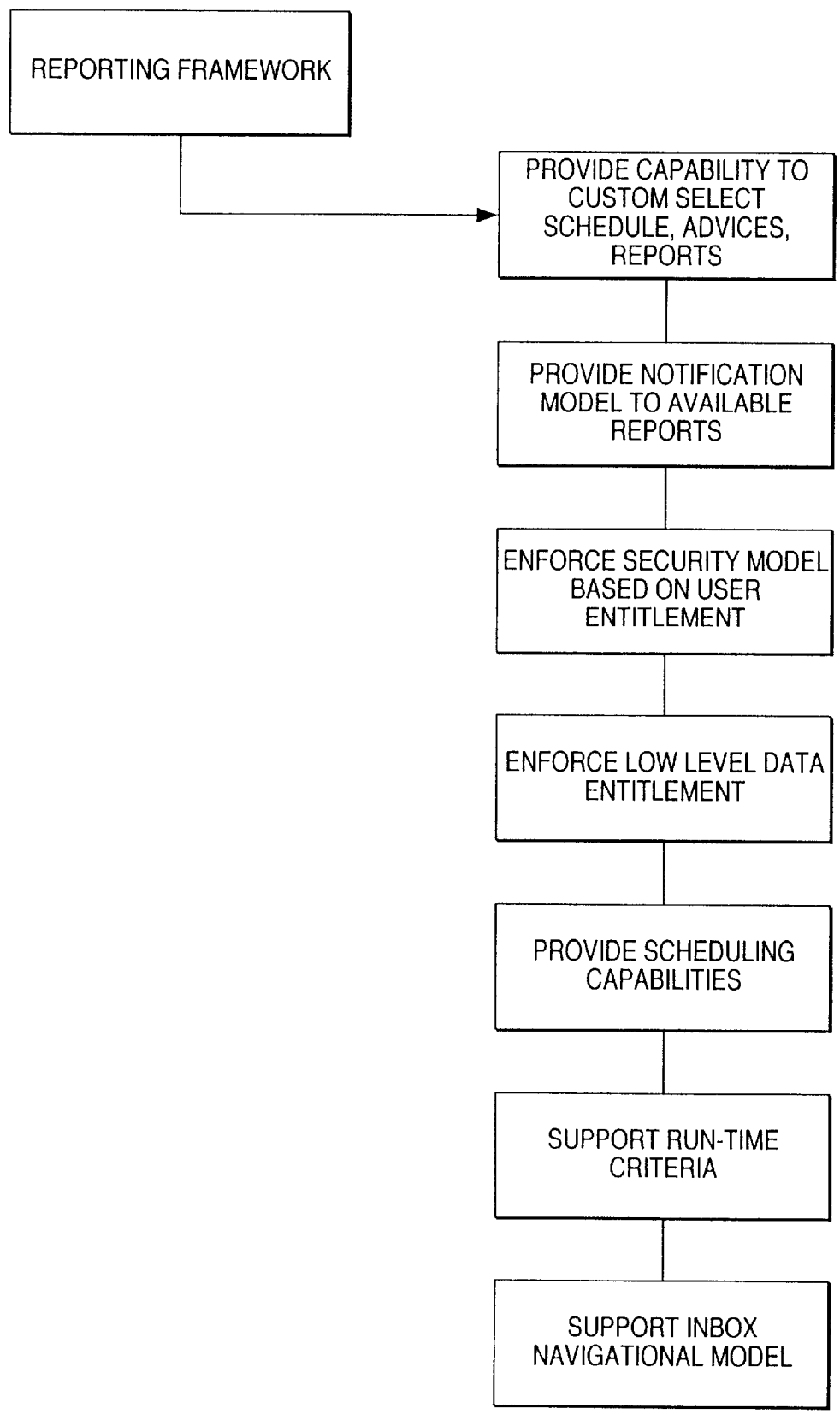
FIG. 7 shows a reporting framework and its functions via a flow chart.

The reporting framework 130 (FIG. 2) provides client users with a capability to custom select, schedule, and view reports on both ad hoc and recurring bases, as shown in FIG. 7. The reports need not only contain transaction information but may also include other information, such as billing information. The reporting framework is both a static and dynamic reporting infrastructure that enables the creation and use of online. reports. It provides a navigation model to available reports, enforces the security manager based upon user entitlement, enforces low level data entitlement at the database for table access, provides scheduling capabilities, supports run-time criteria, and supports the inbox navigation model.

The static reporting support facility uses Crystal Reports designer to define report layout and generate structured query language (SQL). It also uses the Crystal Info three tier architecture to support such functions as scheduling and load balancing. The facility supports various data output formats (e.g., HTML, Crystal.rpt, CSV), supports various delivery mechanisms (e.g., E-mail, MailBox) and can be viewed through a chunking mechanism for more efficient bandwidth utilization.

Figure 8:
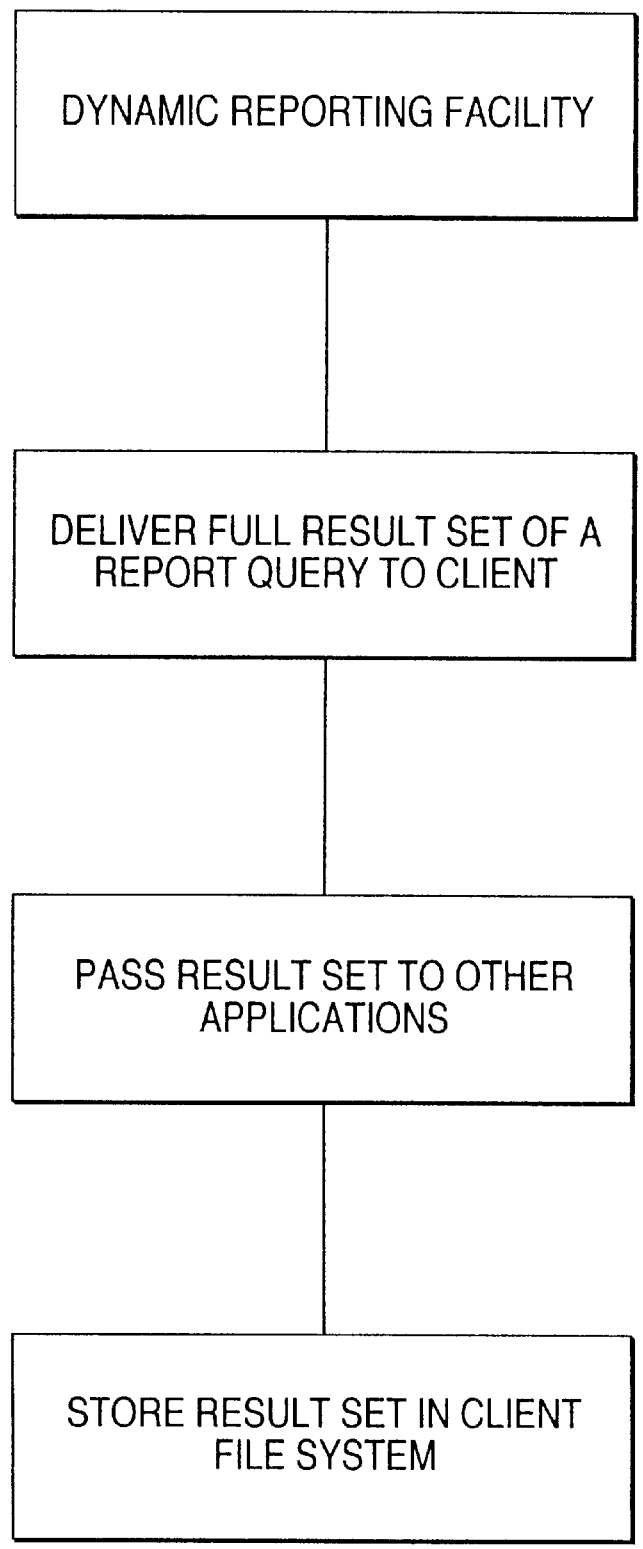
FIG. 8 shows the dynamic reporting facility and its functions within the reporting framework via a flow chart.

Referring to FIG. 8, the dynamic reporting facility allows the full result set of a report query to be delivered to the client. The actual presentation of the result set can be handled by client control. The facility allows the result set to be passed to other client Java applets for charting and other types of graphical reporting needs. Finally, the result set can be stored on the client file system.

The preference manager 140 (FIG. 2) provides a framework for handling user and application preferences. New application preference requirements are registered with the preference manager, which handles such functions as the persistence of preferences and access.

The business services directory or solutions packaging 150 (FIG. 2) is tailored to market opportunities and allows businesses to dynamically package discrete services into customized solutions to meet client needs. This is done through the interactions between entitlements, BSI, and PAS, and other necessary components within the CASA architectural framework as described earlier.

Figure 9A:
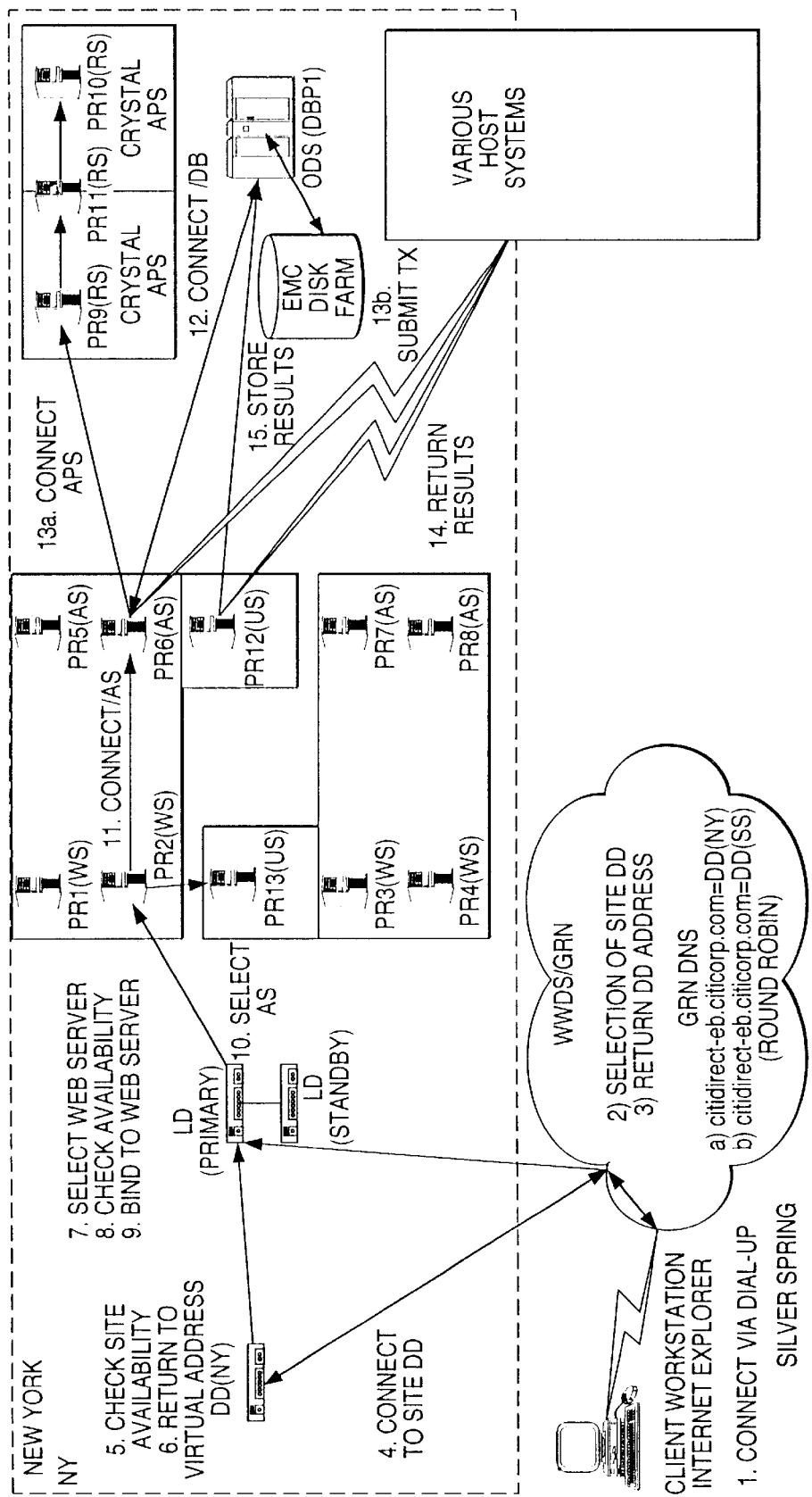
FIGS. 9a–b show the deployment model and its reporting subsystem in accordance to an embodiment of the present invention.
Figure 9B:
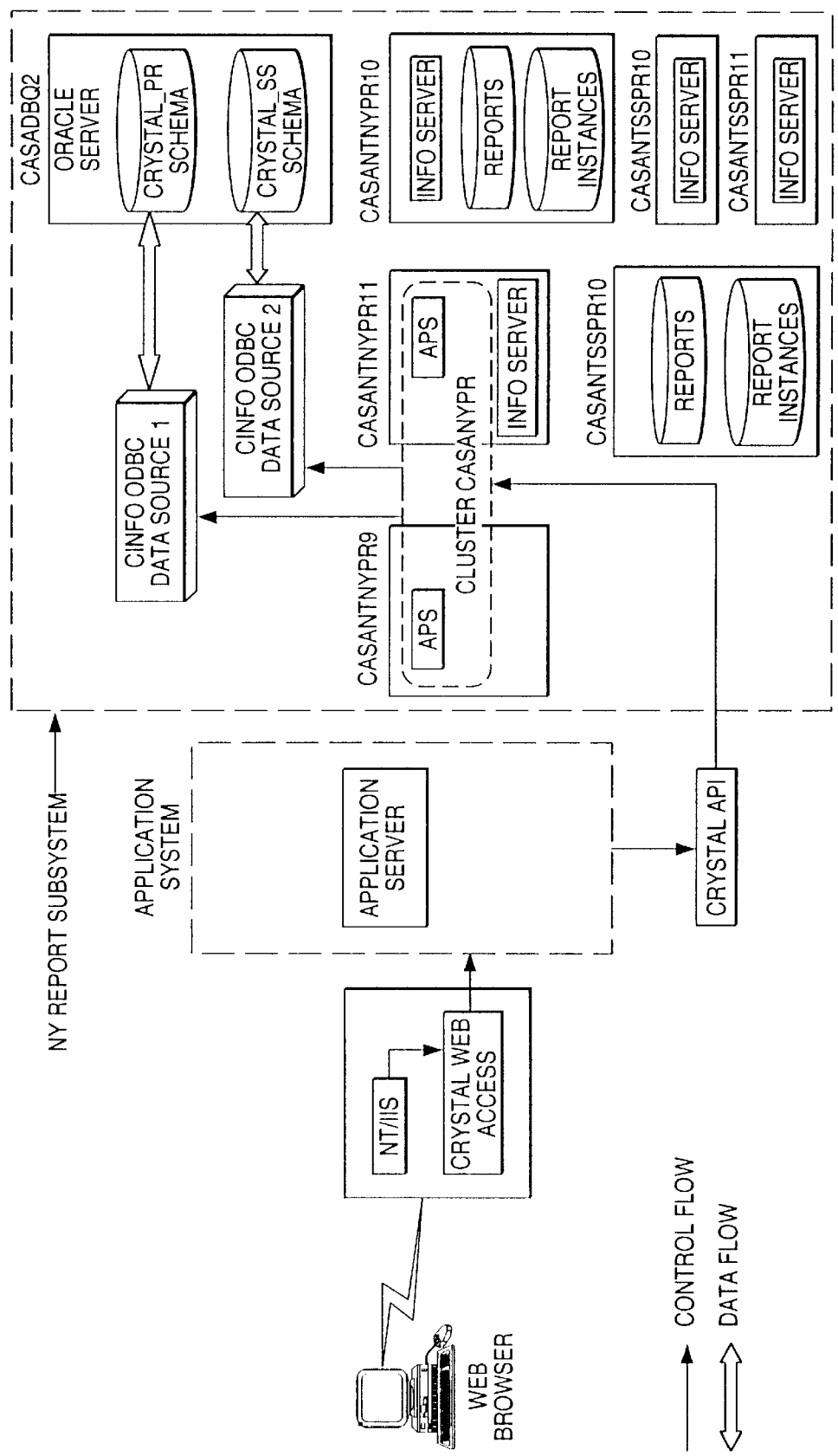

The deployment/packaging feature 120 (FIG. 2) takes advantage of the flexibility of the applications framework 10 to deploy updates of the CASA features to the client users via the network. This eliminates the costly need to dispatch service personnel to individual client sites for the updates. The flexibility of the applications framework 10 also allows for the packaging of additional applications for the client users should they be requested. Again, accessing codes for these additional applications may be forwarded to the client user via the network without the need for a dispatch of service personnel to the client site. FIGS. 9a–b show the technical features of the deployment model for remote clients, along with the reporting subsystem, that employs components of the CASA system.

Another major area of the CASA system in accordance to an embodiment of the present invention is the applications utilities 60 (FIG. 2). Each utility is a major sub-system in its own right that acts to provide common or generic services typically used by applications and thought of from an end-user perspective as stand-alone integration applications. In an embodiment of the present invention, the utilities include a set of Java programs that enable developers to build and easily integrate business applications on CASA.

Several stand-alone common application utilities are also included as part of the comprehensive set of tools in an embodiment of the present invention. These common application utilities include the following.

Figure 10:
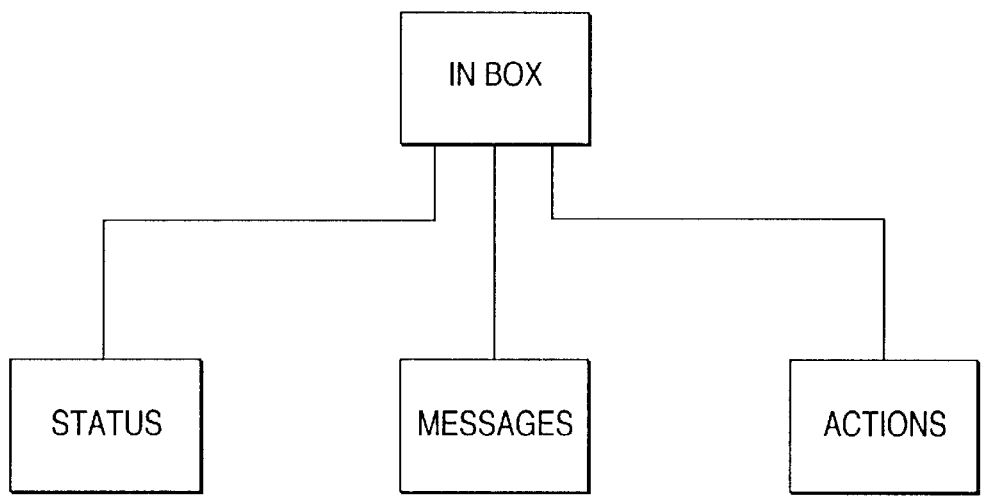
FIG. 10 shows a diagram of the CASA inbox and its capabilities.

As indicated earlier, the CASA inbox 62 is a service category available within the navigation menu. Its purpose is to display unsolicited and solicited messages or information to CASA client users from a variety of sources. The CASA inbox also serves as an alternative navigational model that allows the end-user a single view of the workspace and a way to view pending work, reports that have been run, service messages, and other such items. The main function of the CASA inbox is to display a consolidated list of jobs or tasks awaiting inputs from the user, which allows easy retrieval of information from various different sources. FIG. 10 shows a diagram of the CASA inbox and its capabilities.

In an embodiment of the present invention, the inbox UI includes a separate popup window that remains visible even while the user navigates to CASA's other applications. An example of the inbox UI is shown in FIG. 11. The window has tab folders on top so that user can navigate between status, messages, and action views. The messages view lists and displays all the broadcast CASA messages and any messages that the user subscribed. Action view lists and displays all the items that require user's input to be processed. Whereas, status view serves as the user's central depository, listing and displaying items from both messages and action views.

Figure 12:
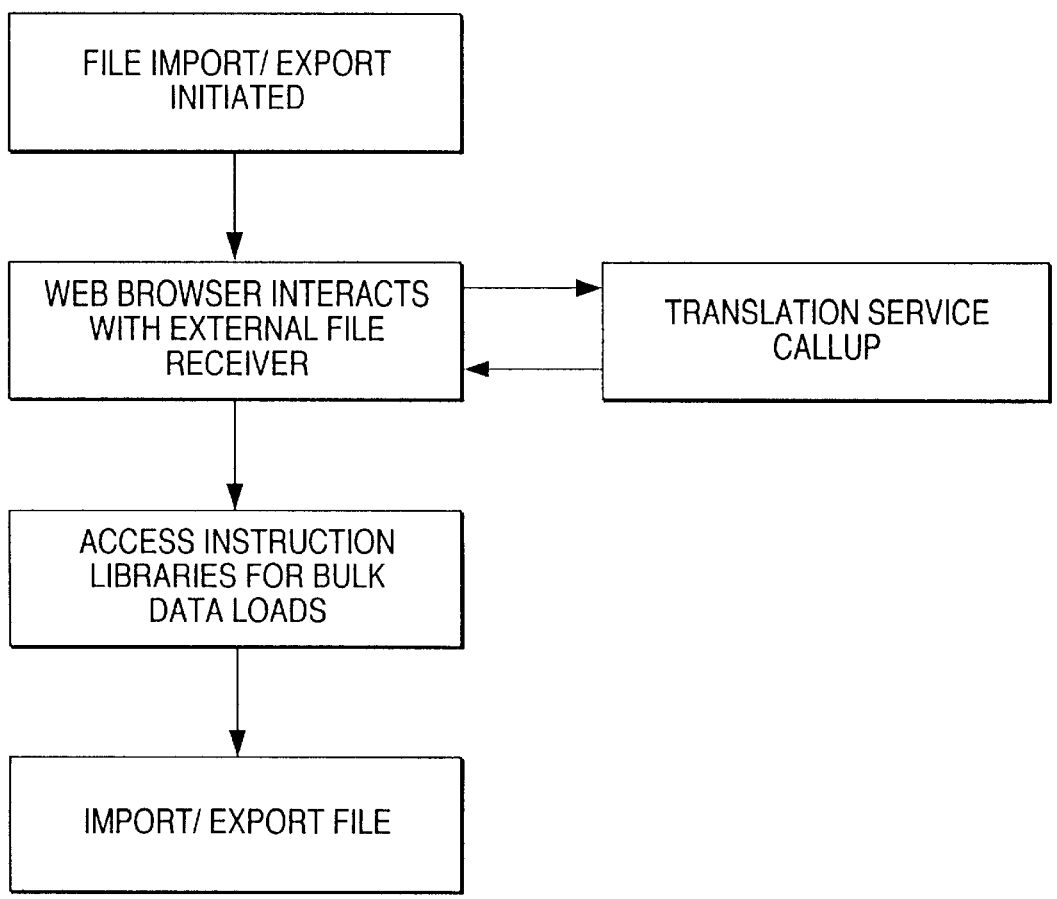
FIG. 12 shows the file import/export functions within the application utilities in the CASA system in accordance to an embodiment of the present invention.

FIG. 12 shows another application utility, the file import/export functions. File import 64 (FIG. 2) provides for two types of imports, in-session file import and out-of-session file import. In-session file import is supported via, for example, a Web browser and delivers information over HTTP. Import collaborates with translation services, instruction, and libraries within the CASA system to provide an efficient mechanism for bulk data loads typically originating from another system. File export 63 (FIG. 2) supports industry standard output formats to extract customer data out of the invention to feed into an end-client proprietary system.

E-mail infrastructure 61 (FIG. 2) allows client services representatives and other personnel to communicate with clients. This feature enables pro-active delivery (e.g., confirmation of services, market research) of critical information. The ability to provide help documents and other marketing information is provided by an embodiment of the present invention via an extensive intra-net self-publishing model (ISPM).

Figure 13:
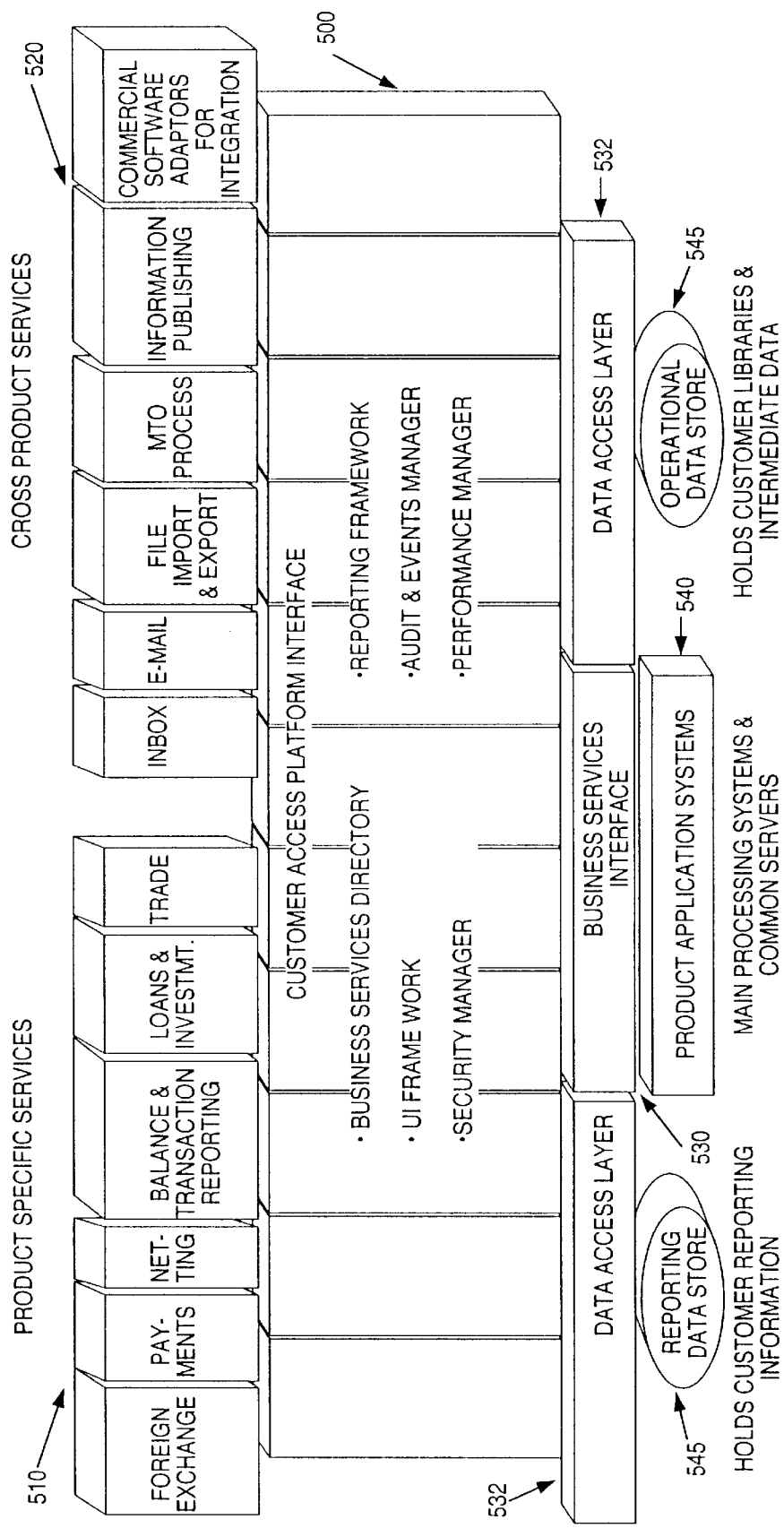
FIG. 13 shows a system functional view of the CASA comprehensive infrastructure in FIG. 2.

FIG. 13 shows a system functional view of the CASA comprehensive infrastructure of FIG. 2 as described above. As shown, the customer access platform interface 500 includes the business services directory 150, UI framework 13, security manager 100, reporting framework 130, audit logging manager 50, and events and performance manager 40 of FIG. 2. This platform interface 500 provides customers with access to a myriad of services offered by the host institution, such as product specific services 510 and cross product services 520, by accessing the back-end product processors, which include the PAS 540 and data stores 545, via the DAL 532 and BSI 540, as described earlier.

Figure 14A:
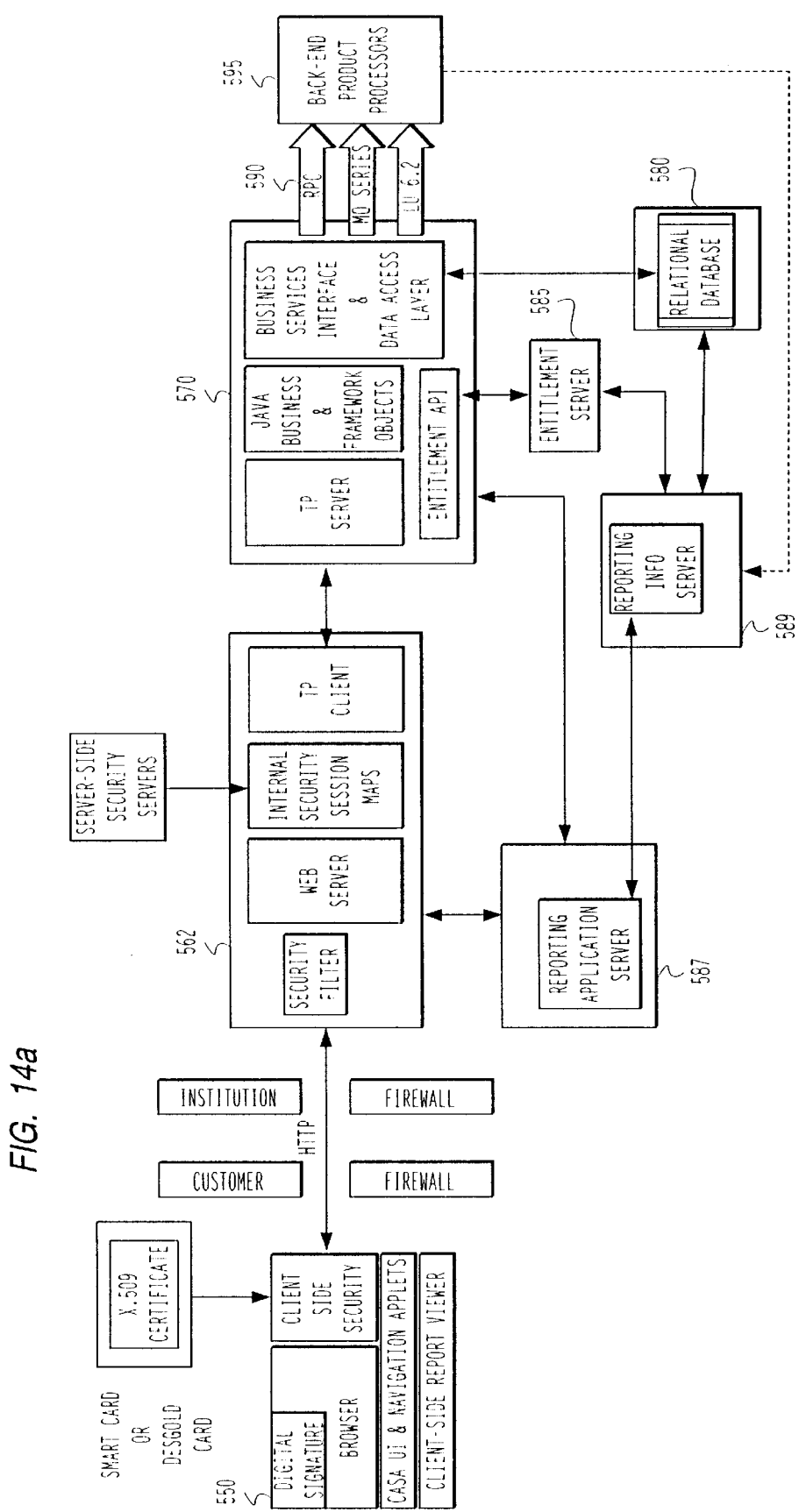
FIG. 14a shows a high-level view of the basic CASA architectural constructs of an embodiment of the present invention.
Figure 14B:
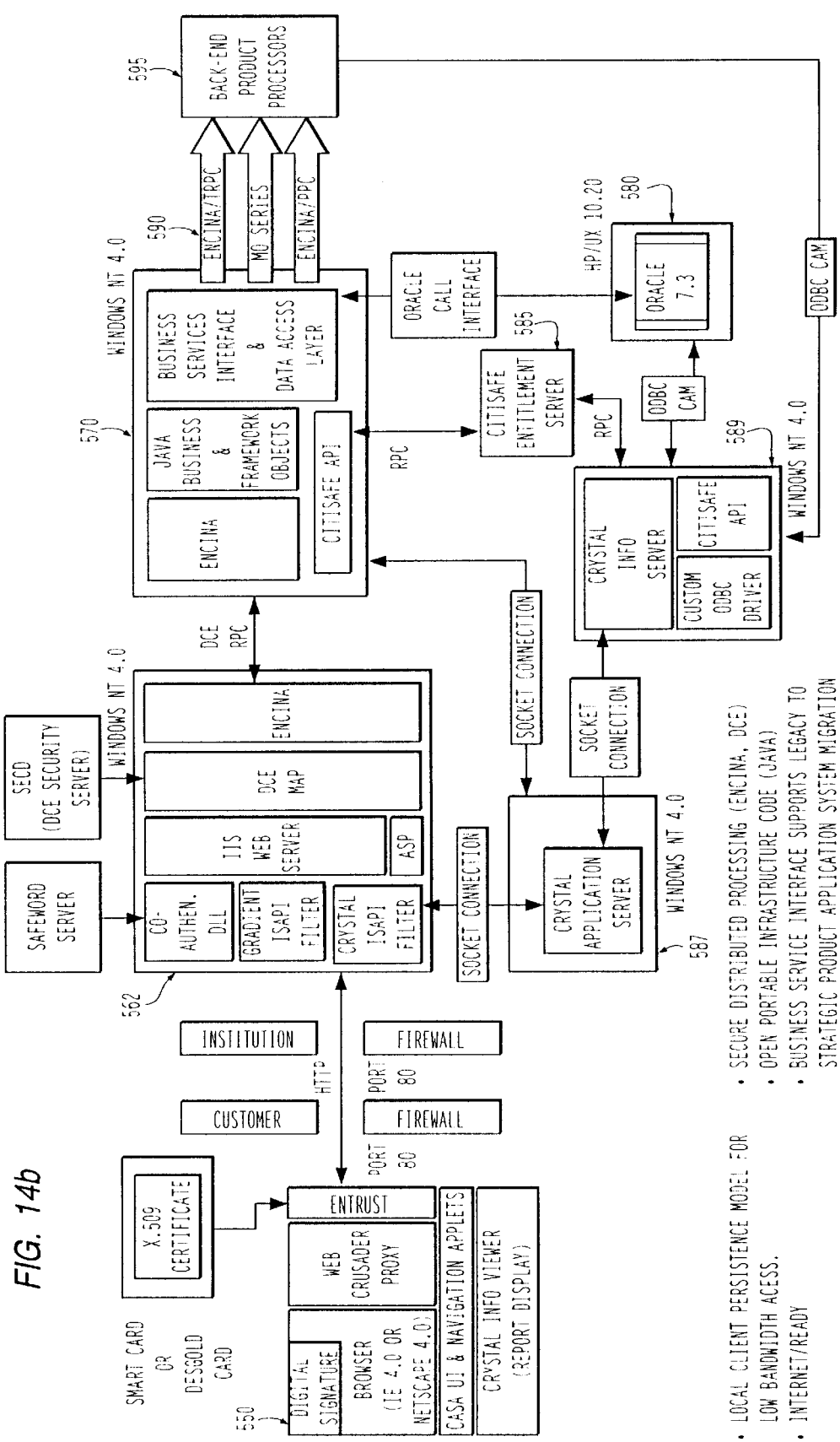
Figure 14C:
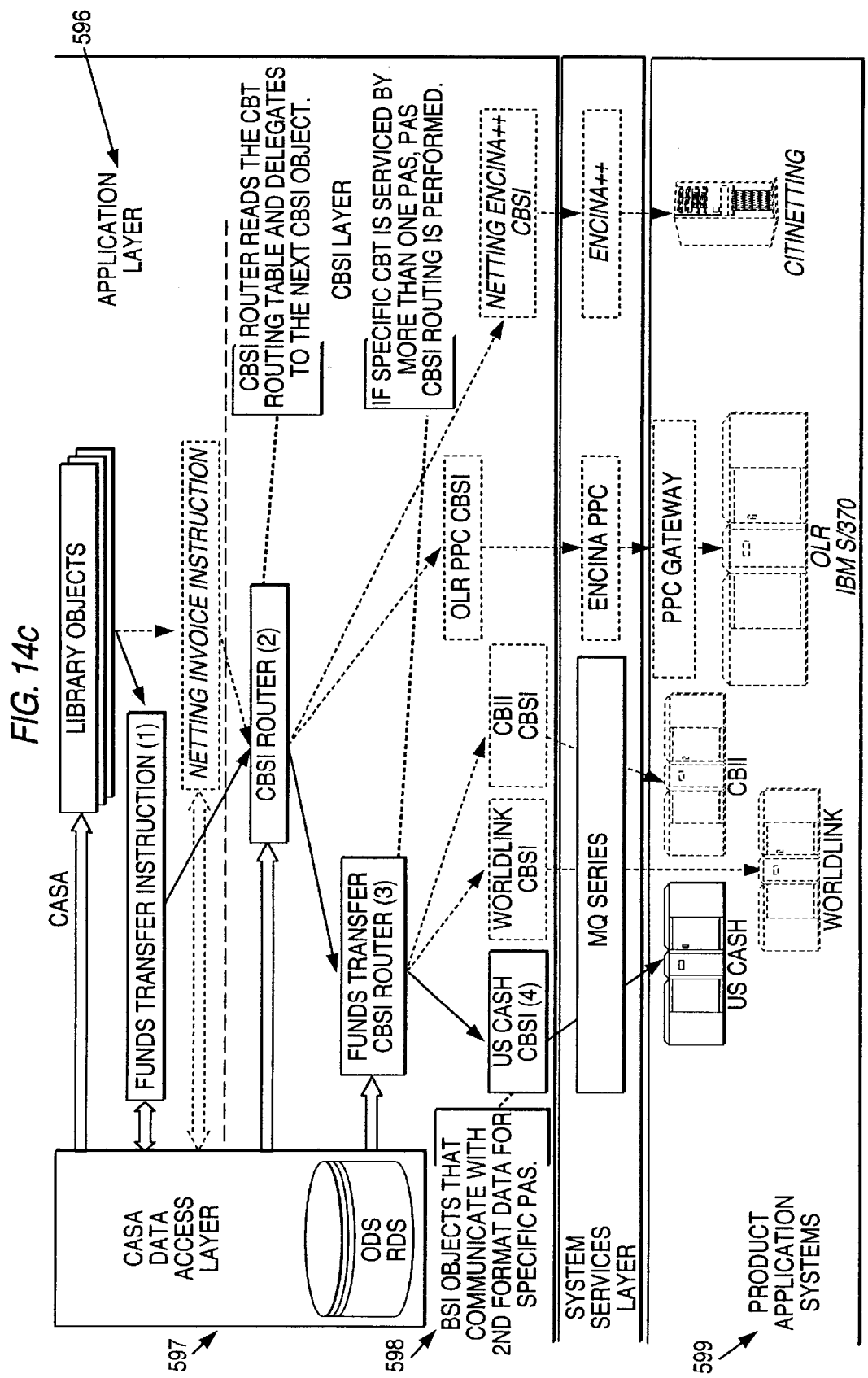
FIG. 14c shows a technical architecture of the business services interface and the data access layer of the CASA system shown in FIG. 14b.

Referring to FIG. 14a, in a true client/server nomenclature according to an embodiment of the present invention, the system comprises clients which request or invoke services and servers that respond to invocation or requests. Shown are the client workstation components 550, the web server 562, the applications server 570, the database server 580, the entitlement server 585, and reporting servers 587 and 589, as well as interfaces 590 to back-end product processors 595, which include the PAS and various common reporting and operational data stores. This figure also provides information with respect to the communications methods employed by each component. FIG. 14b shows a detailed view of the CASA architectural constructs of FIG. 14a and incorporates examples of components that can be used in the CASA system, and FIG. 14c further shows the technical architectural details of the BSI and DAL within the applications server 570 of FIG. 14b. As shown in FIG. 14c, there is at least one BSI object 598 for every PAS 599 that CASA is connected to, and the DAL 597 allows the application level objects in the application layer 596 to manage persistent data storage in CASA data store, which includes the operational data store (ODS) and the reporting data store (RDS).

Figure 15:
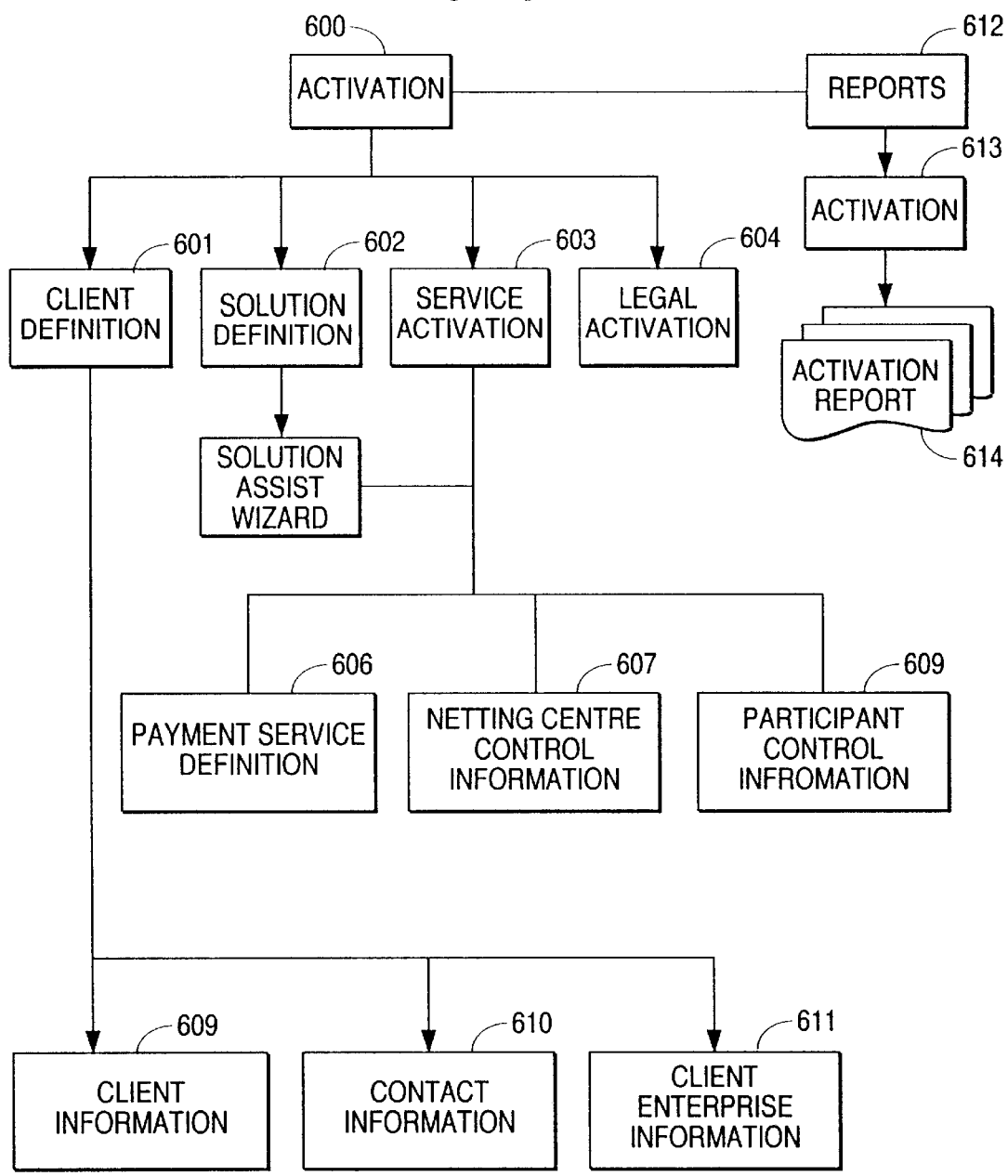
FIG. 15 shows the organization of activation on CASA in accordance to an embodiment of the present invention.

Activation of a new CASA customer or client will now be described in detail with reference to various components of the CASA system as described earlier. FIG. 15 shows a diagram of the organization of activation on CASA in accordance to an embodiment of the present invention. The activation process 600, which can be performed by the host institution or the client, is composed of the following functions: a client definition function 601, which is used to define the client, the client contacts, security requirements, and enterprise structure to CASA; a solution definition function 602, which is used to define the services that the client requires, and it consists of a solution assist wizard 605 which guides the client or host institution through the service selection and solution package assignment process through a series of questions and answers; a service activation function 603, which provides and enables the entry of service information through using service definition forms, each existing for a service class that is provided on CASA, such as payments or intra-company netting; a legal activation function 604, which is used to automatically select the legal documents that are required for client activation and entitlements on CASA; and the activation reports 614, which are used to provide the CASA implementation groups of the host institution with the information required to establish the client on the back end processors 595 shown in FIGS. 14a and 14b.

Figure 16:
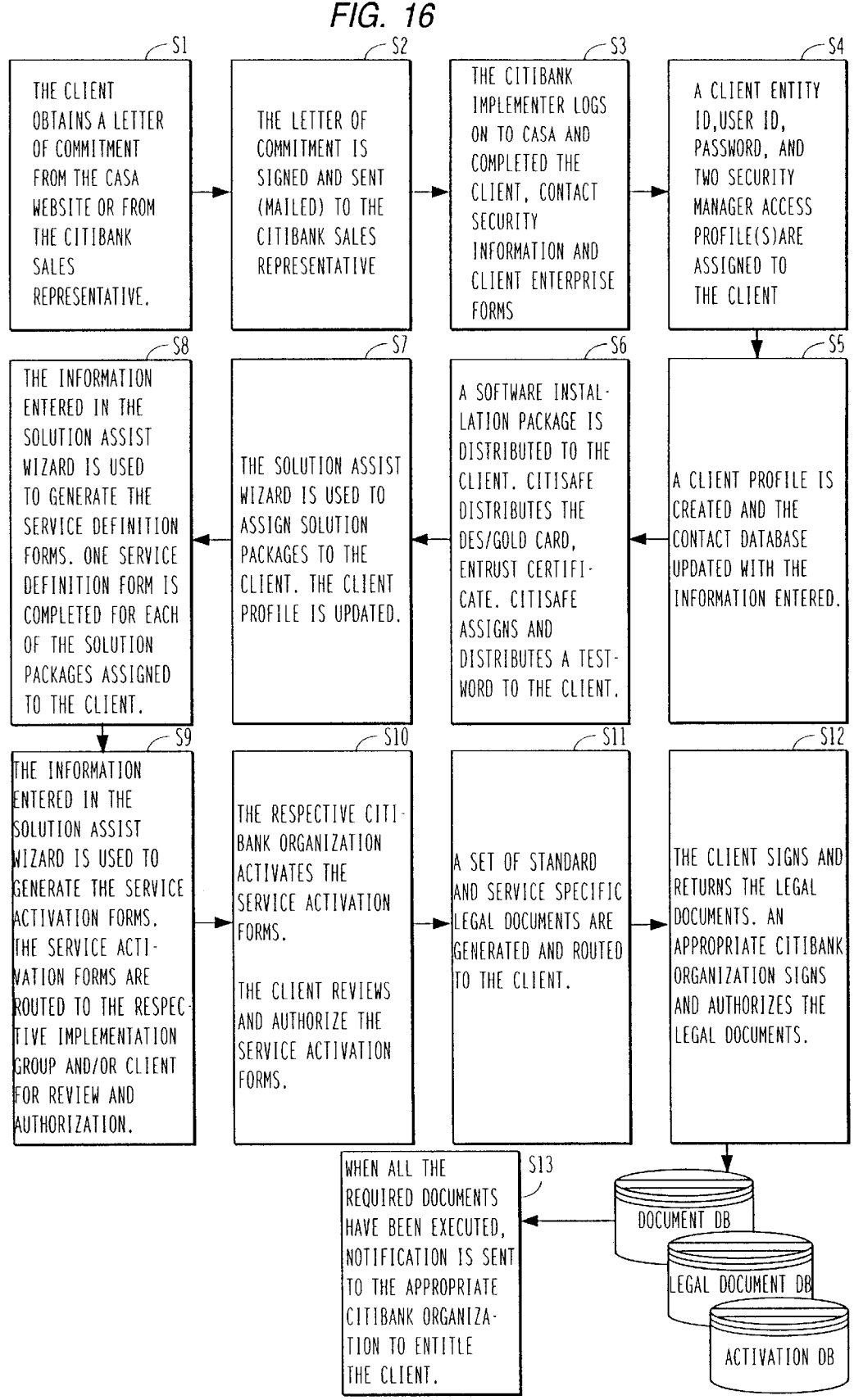
FIG. 16 shows a diagram representing the activation process flow in accordance the organization of activation in FIG. 15.

FIG. 16 shows the steps in an activation process flow according to the above embodiment. In step S1, a client first requests certain services being provided by the host institution and obtains a letter of commitment from the host sales representative or the CASA web site. In step S2, the client signs the letter of commitment and mails the letter along with relevant client information to the host institution. In step S3, once the letter and client information are received by the host institution, the CASA implementation groups, using the client definition from the activation menu in the CASA system, would complete the client contacts, security information, and client enterprise forms on the system. In step S4, the client is now assigned a client entity ID, user ID and password. In step S5, a client profile is now created, identifying client information such as client entity, primary contacts, client legal structure and the solution packages assigned to the client. A contact database within the CASA system is also updated with the information entered.

In step S6, the host institution distributes to the client a software installation package, a testword to authenticate the client, and the DES/Gold cards and Entrust Certificates that are required to provide the security manager access to CASA or to establish user entitlement. The installation software can be deployed on a storage medium such as CD-ROM or diskettes, or downloaded from the CASA web site. The DES Gold and Entrust libraries in CASA system are updated, and the serial numbers of the DES Gold cards that are sent to the client are entered into the DES Gold library. This provides an audit trail and enables the host institution to authenticate the client entity and its users. In step S7, once the installation on the client system is complete, and the client is authenticated and logged on to the CASA system, the client, with or without the assistance of the host sales representative, selects the solution assist wizard 605 (FIG. 15) to create and assign the desired solution packages to the client. The solution packages are assigned to the client based on the functions selected. The client profile is then updated. In step S8, service definition forms are automatically selected and generated by the CASA system based on the information entered in the solution assist wizard and the solution packages assigned to the client. One service definition form is completed for each of the solution packages assigned to the client. The client profile and activation library are then updated.

Alternative to steps S7 through S8, the client or the host institution can directly select the Service Activation function 603 from the activation menu in FIG. 15 to show a listing of service definition forms. The client or the host institution then selects a service definition form and enters the information required to complete the form. This process is repeated for each service definition form that is required to define the functions the client wishes to perform. Solution packages are then assigned to the client based on the services selected, and the client profile and activation libraries are updated. In step S9, service activation forms are automatically generated based on the solution packages assigned to the client, the information found in the service definition forms, and the information contained in the client profile. These forms are automatically routed to the respective implementation group and/or client for review and authorization. Alternatively, the service activation forms can be entered individually by the client via the service activation function in the activation menu, and they are printed and signed by the client and mailed to respective organization handling the services within the host institution.

In step S10, the respective host organization activates the service activation forms once the client reviews and authorizes the service activation forms. In step S11, a set of standard and service specific legal documents with regard to the requested services are generated and routed to the client, and legal document library in the CASA system is updated. The client either authorizes the legal documents or requests modifications. If modifications are requested, an e-mail message is sent to the appropriate legal organization within the host institution outlining the requested modifications. This process is repeated, until both parties reach an agreement. In step S12, once the client signs and returns the agreed legal documents. An appropriate host organization signs and authorizes the legal documents. The documentation database, the legal document database, and the activation database in the CASA system are now updated, and in step S13 notifications are sent to the appropriate host organization to entitle the client to the various requested services. According to this embodiment of the present invention, the client can request additional CASA services from the host institution by repeating the above steps, starting at step S7.

The beneficial features of CASA business services according to an embodiment of the present invention include 1) customization, 2) user navigation, 3) collaboration, and 4) customer service, each of which is described further below.

1) With the customization feature, once a client entity is activated by the CASA system, the client is able to customize the default standard navigation menu by viewing the structure of the available personal service group (the Categories, classes, and forms to which the client access rights), and then applying a custom organization to it. Users within each client entity are also provided with customization feature to further customize the modified navigation menu from the client entity above. The custom menu is not required to contain all services to which the client entity or a user has access. Rather, they are able to switch between their custom menus and standard menus. This ensures access to all services, regardless of customization.

Figure 17:
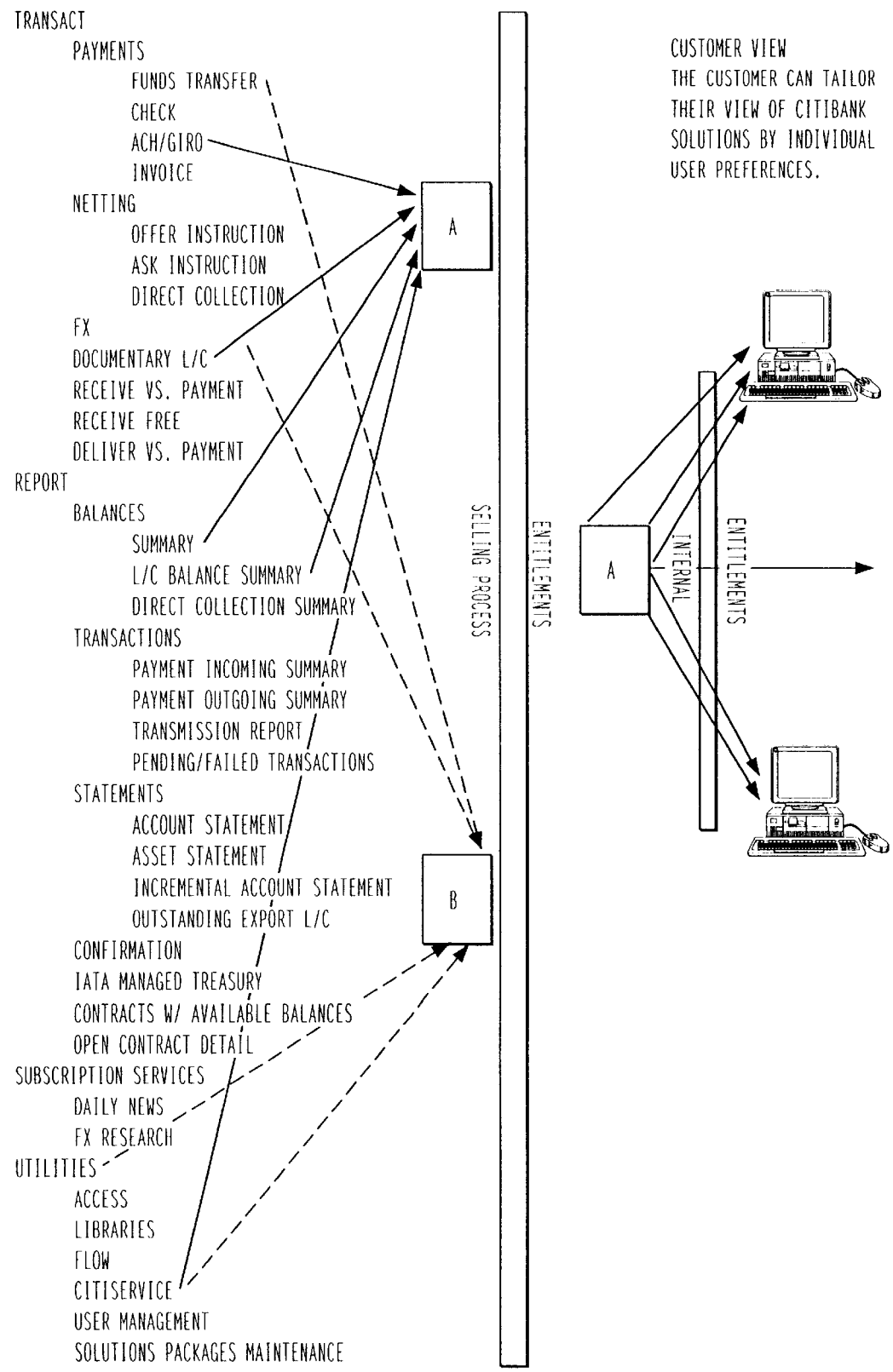
FIG. 17 shows the various layers of customization possible in the CASA system.

The system software of the present invention enables customization on various internal and external levels. Thus, electronic banking services can move further toward true, tailored solutions, shaped by industry or by customer need. This is best seen in FIG. 17. The first layer of customization occurs at the "services provided to the customer by the bank" level. By way of example, if the bank had twenty (20) services, one client may only purchase ten (10) of the services while another client may purchase fifteen (15). Thus the first layer of customization occurs at the level of service provided to the client by the bank.

A second level of customization occurs at the group level. A large corporation may purchase a plurality of services from the bank, but will have a plurality of departments which will be specialized. An example would be one department that strictly deals with domestic transactions. While a transaction application of the system available from the bank will be able to handle both international and domestic transactions, the second level of customization will limit a purely domestic operation to only domestic transactions. Alternatively, having two applications for international and domestic transactions, the group level specialization will restrict the domestic department's access to only the domestic application and not the international application and vice versa.

Finally, another layer of customization occurs at the individual user level. This allows for each employee to customize the system for his or her needs. For example, employee A deals primarily with only a handful of clients. Using a pop-up window that lists all possible clients handled by the client firm would be inefficient. The present invention allows the individual to select just a few client names from the global list and access them as needed. This eliminates electronically thumbing through many names which that particular employee does not use.

Figure 18A:
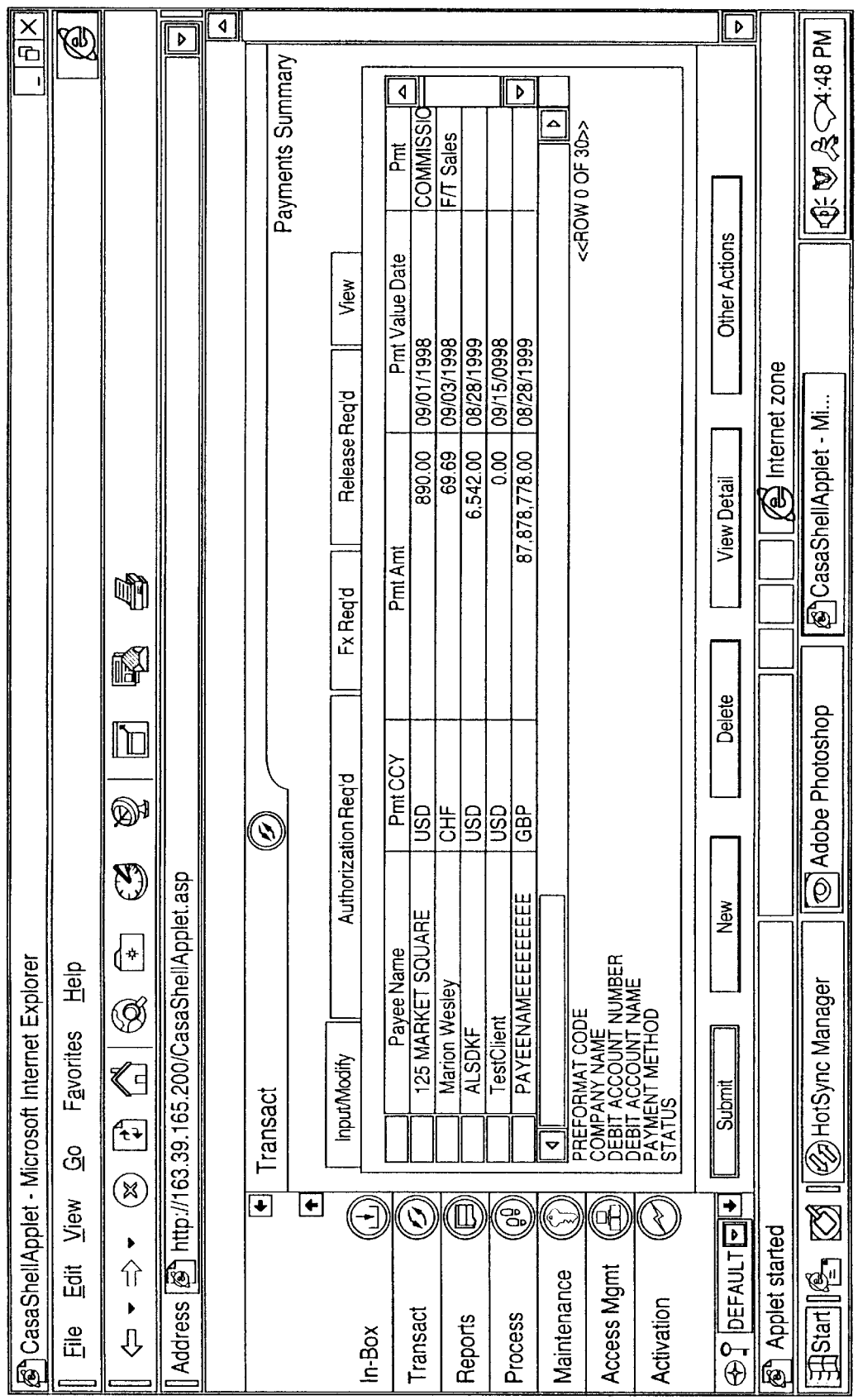
FIGS. 18a–h shows a CASA graphical user interface in the form of various custom menus in windows format.
Figure 18B:
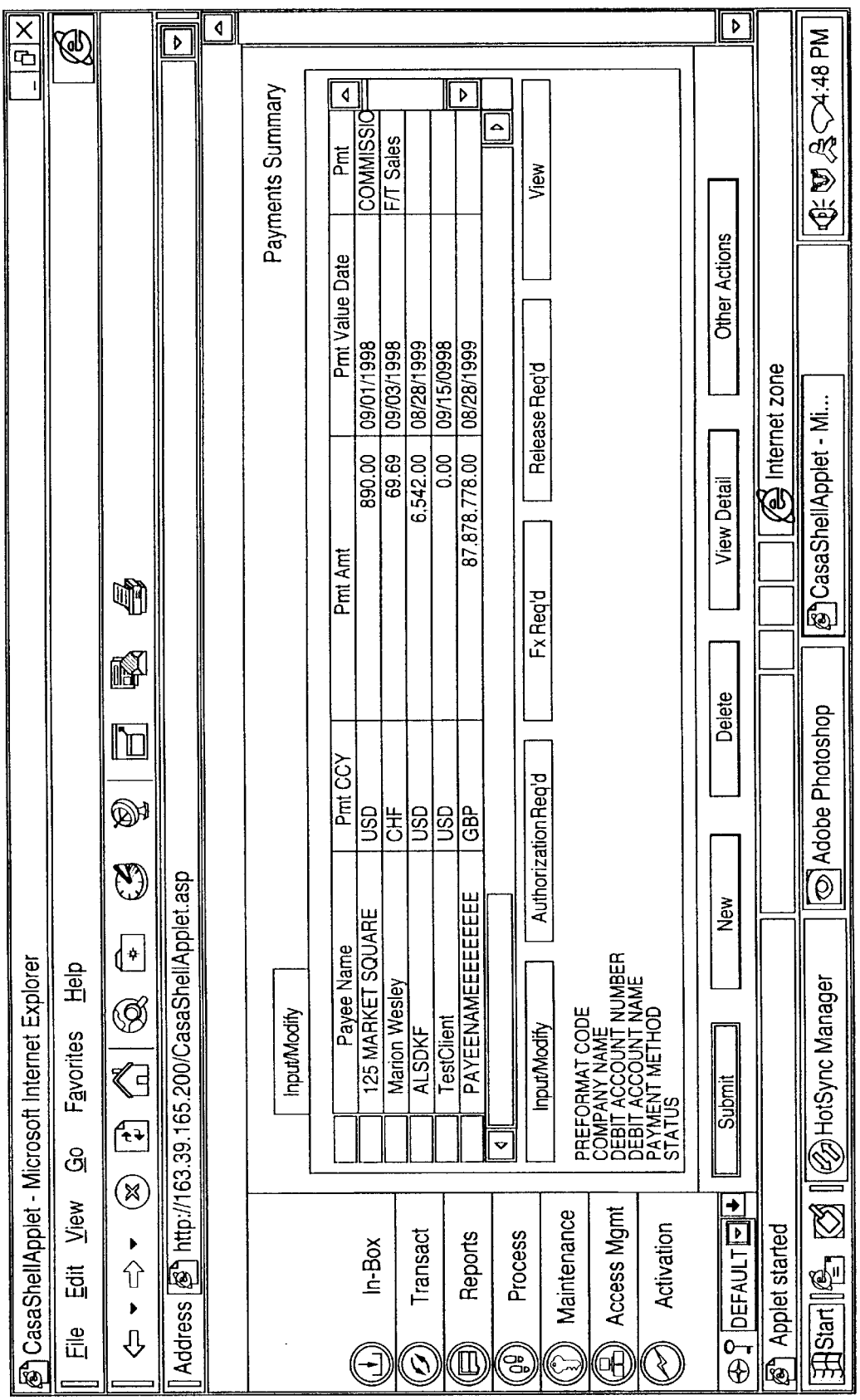
Figure 18C:
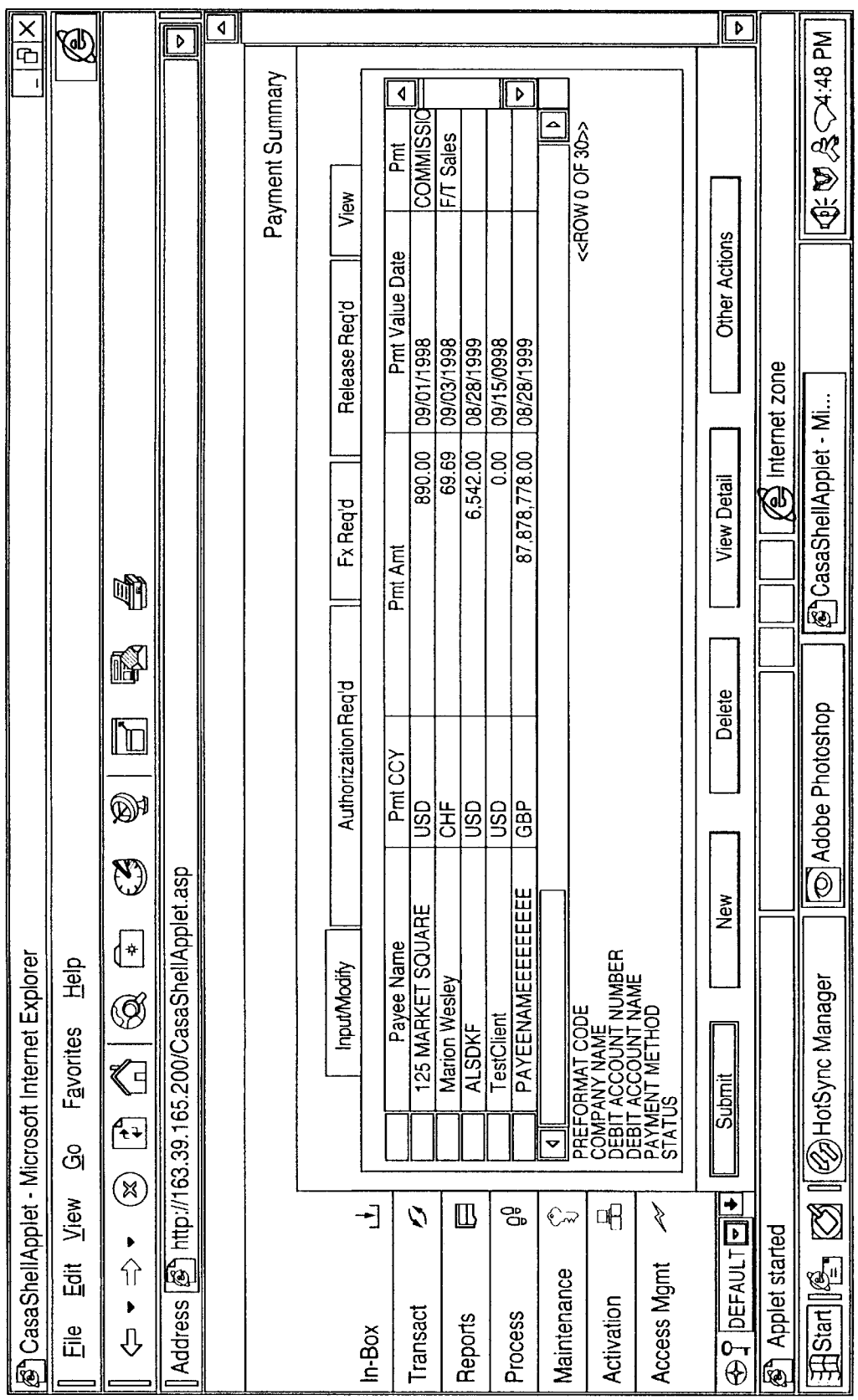
Figure 18D:
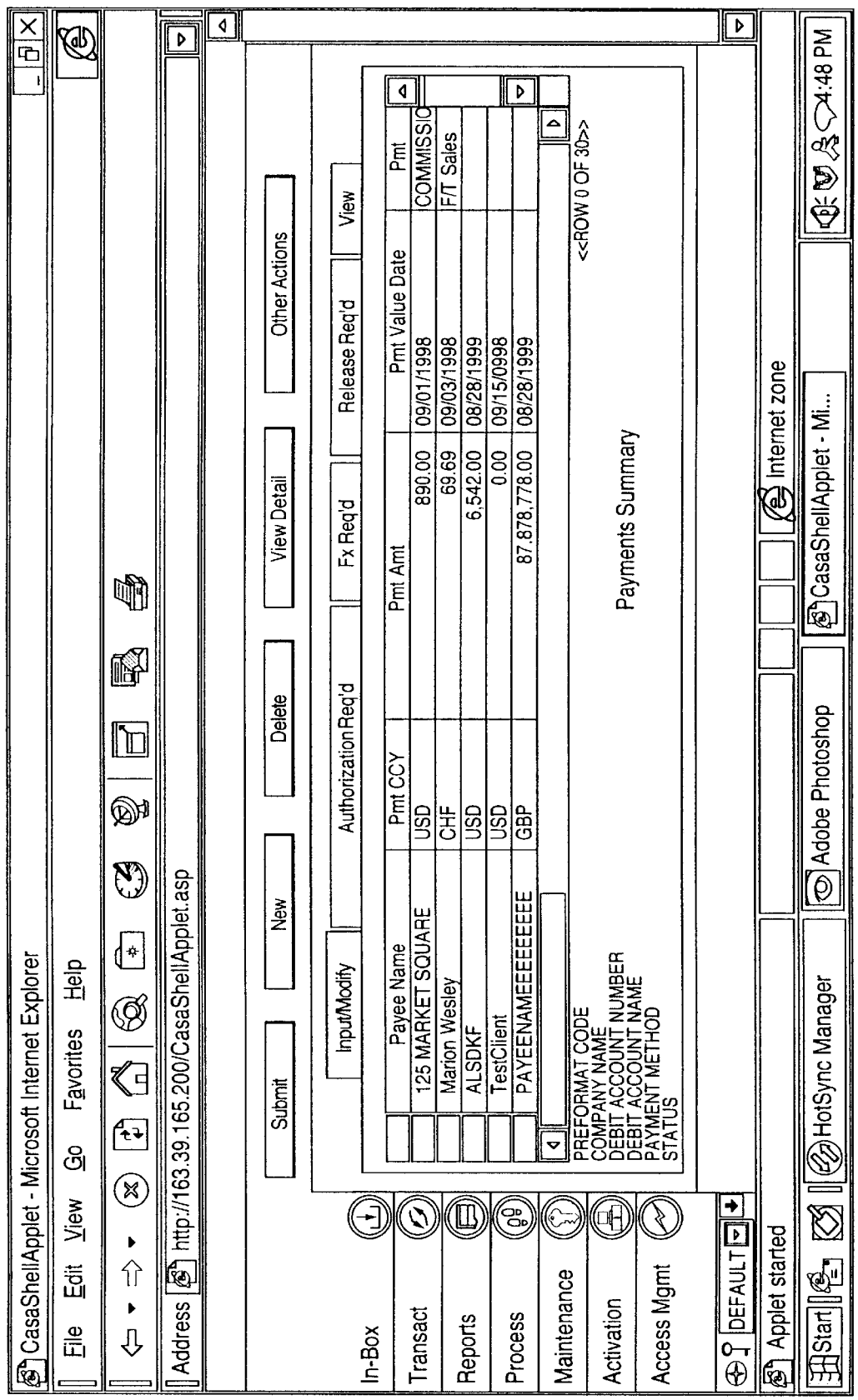
Figure 18E:
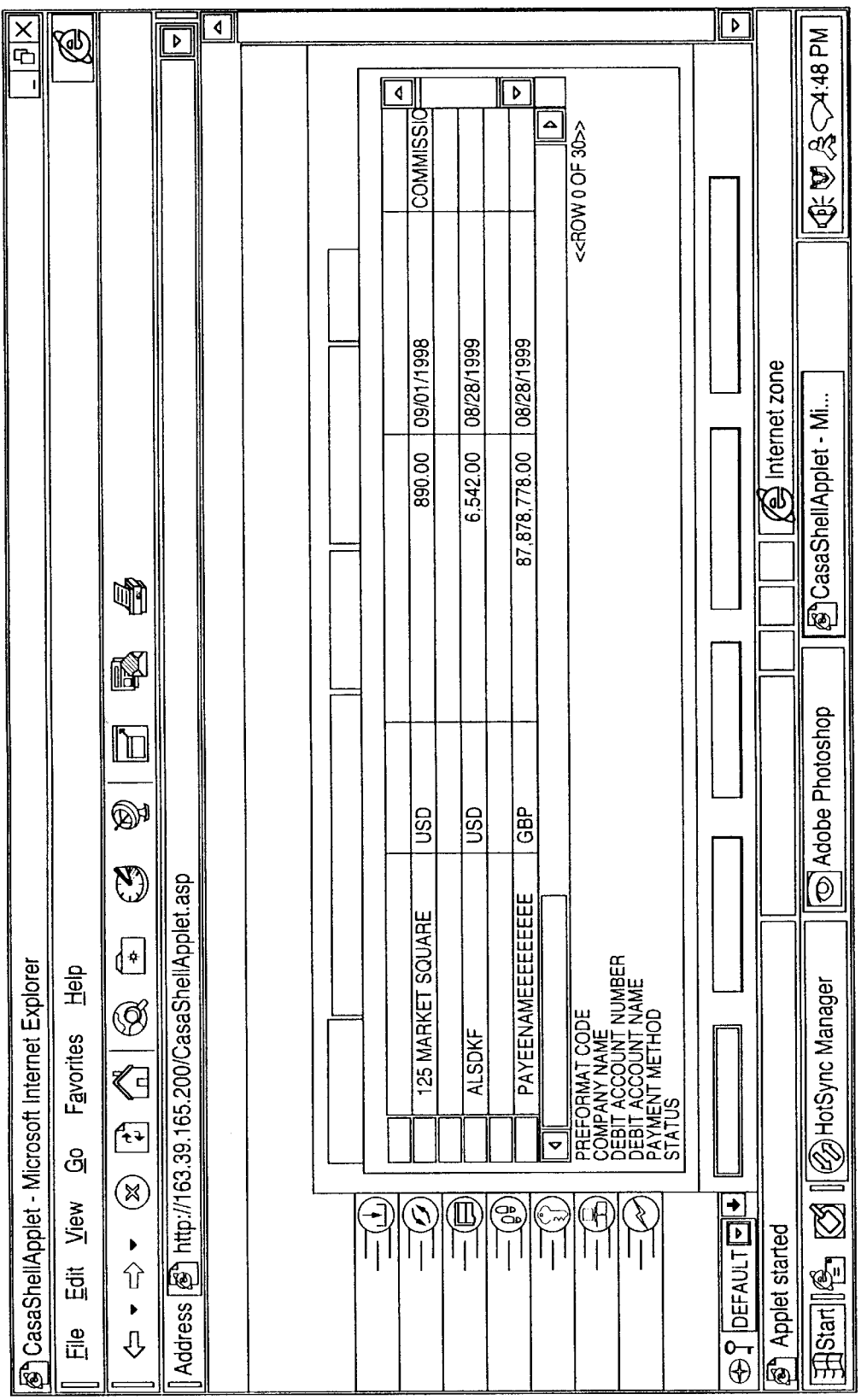
Figure 18F:
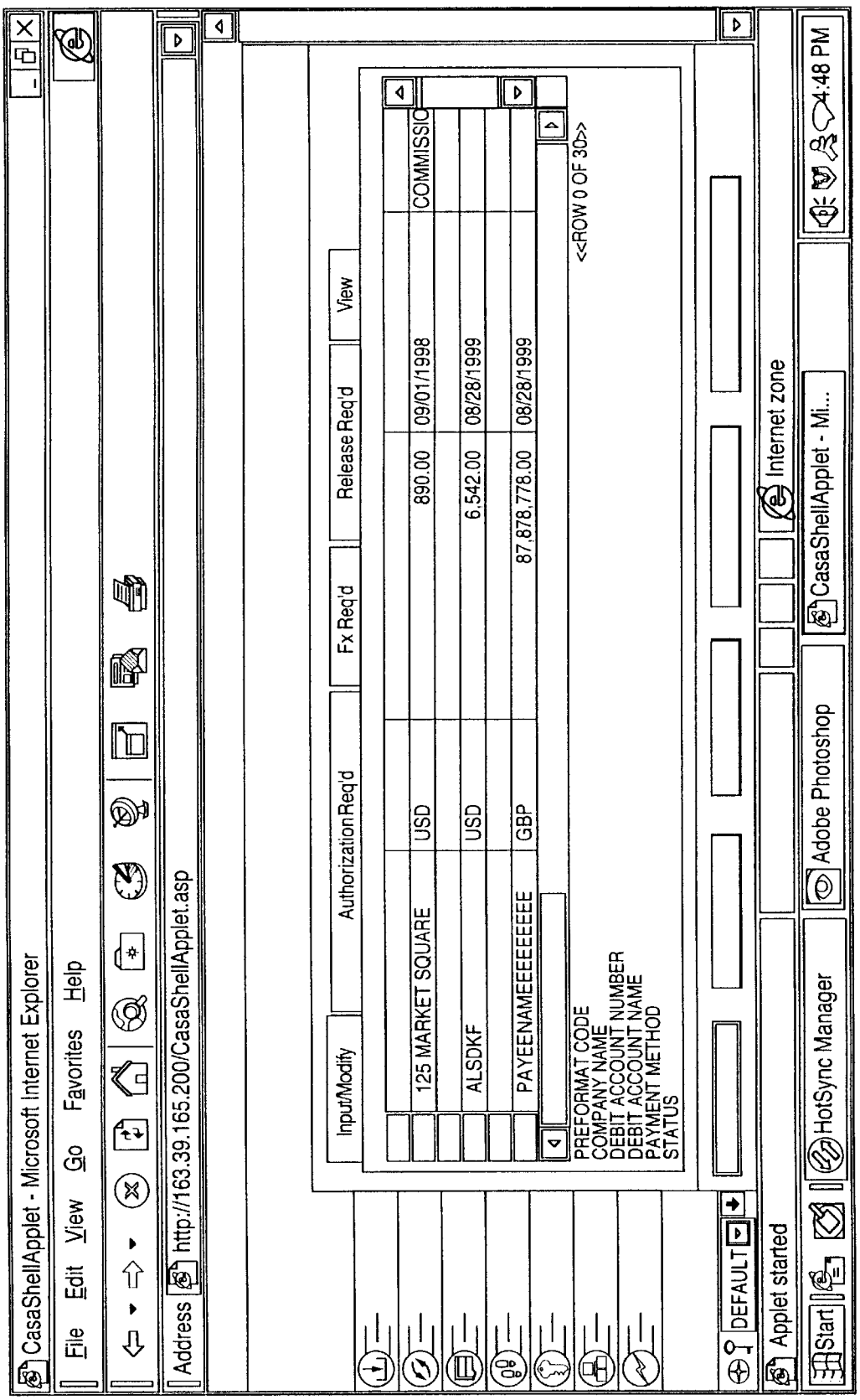
Figure 18G:
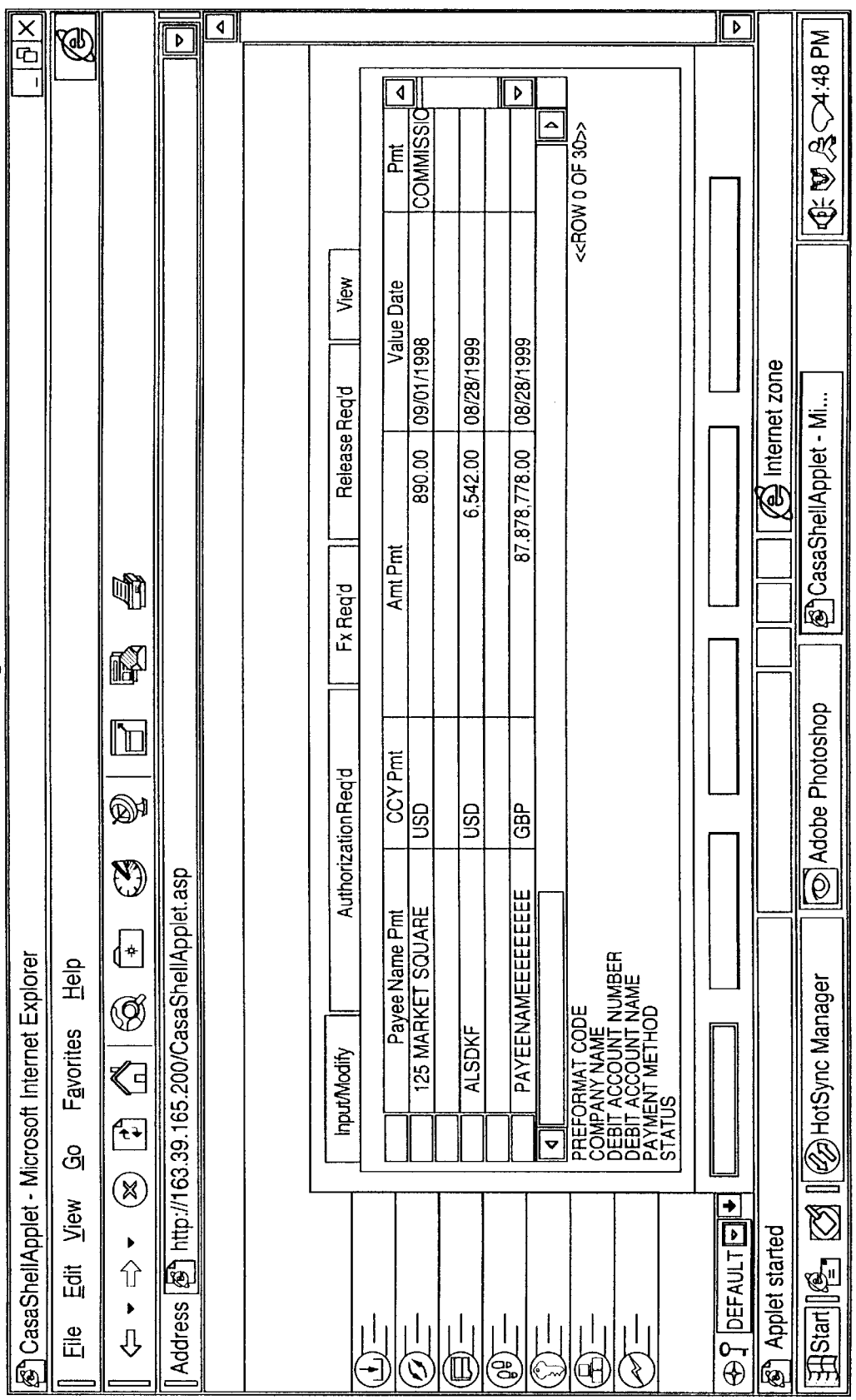
Figure 18H:
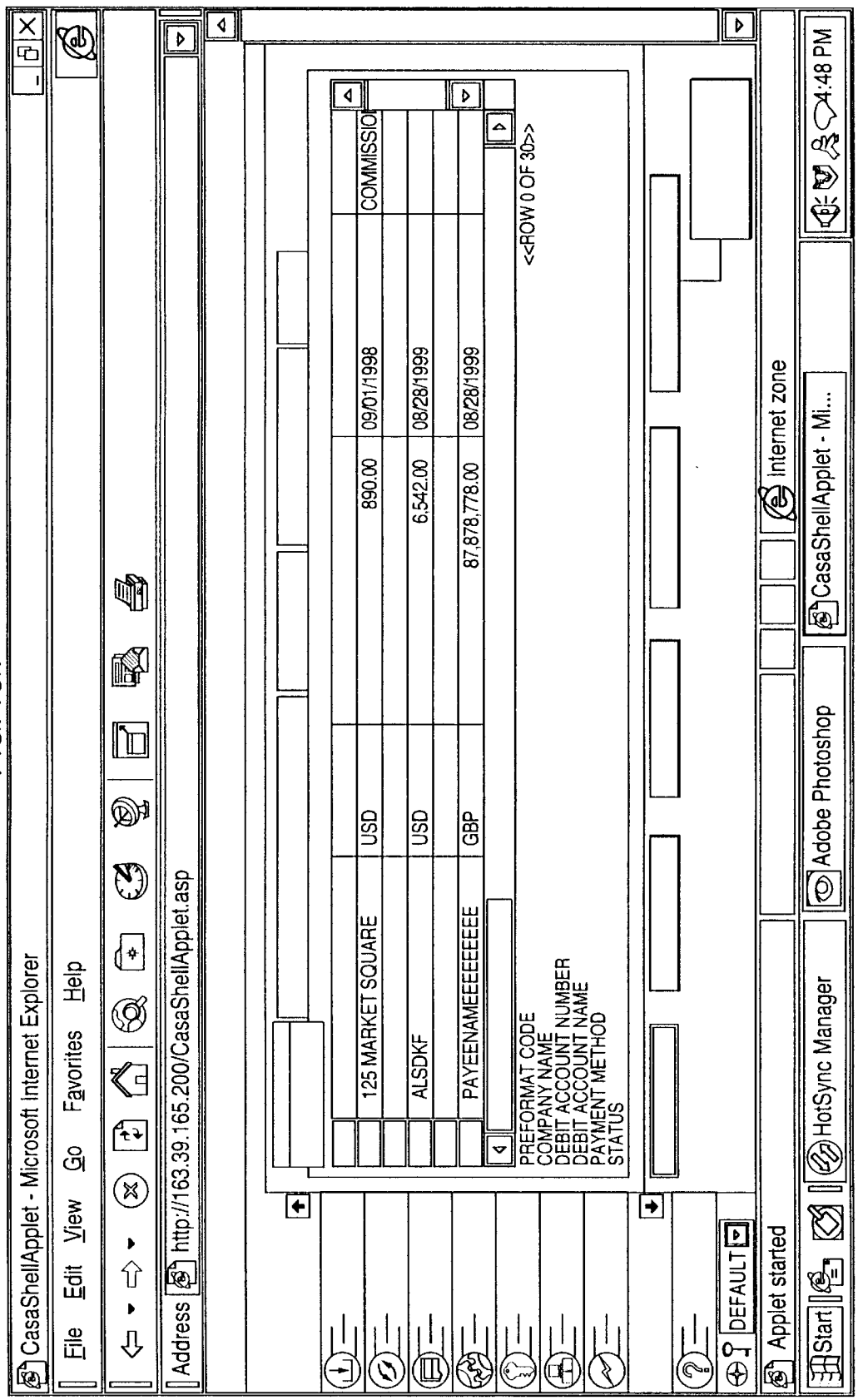

2) User navigation is achieved by the UI, which includes many user-friendly screen features. In one embodiment of the present invention, the user is first greeted by a welcome screen with language choice. For security purpose, the user is next prompted for entry of user ID and password to log into the user's account. Upon correct verification of the user identity by the system, the user is connected to his or her account, and the user can perform with the aid of a mouse any desired and entitled banking services on the account via a window-based navigation screen or shell that includes a navigation menu, an application specific main menu, and other popup menus. The overall benefits include efficient and cost effective implementation of software updates and new banking services, enhanced customer service, faster development and delivery to market of new softwares, use of leading edge technologies, improved communication speeds, and user-friendly windows/mouse environment. Furthermore, because the UI includes the above customization feature which allows navigation menus to be customized, the system eliminates unnecessary information and activity by delivering entitlements that are user-specific. FIGS. 18a–h show examples of some of the possible ways that a user can customize a standard navigation menu. FIG. 18a shows, for example, a standard menu for the transact service category, as described earlier with reference to FIGS. 3 and 4. FIGS. 18b–d show some of the possible modifications of FIG. 18a, and FIGS. 18e–h show blank menu buttons to allow the user to rename menu items to names with which the user is more comfortable. It should be noted that user entitlement to specific features, functions, and applications, as authorized by the above client entity and the host institution, may also affect the how the navigation menu can be customized in FIGS. 18b–h.

3) The system software for collaboration supports several types of communication between clients and clients and the bank. The communication paths can be broken down into three main categories. The first can be characterized as an off-line system. This is most like an email system. One client sends a message to another client or the bank, regardless of whether anyone at the receiving institution is on line or not, and the message is queued to the recipient. When the recipient goes on line again, the message will be there waiting for him or her in the recipient's inbox.

The second messaging system involves public comments. The system software supports bulletin boards. These bulletin boards may be restricted to specific clients or may be available to all clients. Generally, the bulletin board allows anyone to post comments and read comments posted by others.

The third type of message is a real time message. This is a message that can be sent to a recipient who is on-line at the moment the message is sent. This type of message supersedes the other processes for a moment on the recipient's terminal or PC. In this manner, if the message sender needs immediate information, he can request it and get a response via a similar message in substantial real time. One form of real time communication in accordance with this embodiment involves a chat room. Here, messages are posted publicly for all to view and respond to. The correspondence could be one-on-one or with multiple participants depending on the chat room used. Another form of real time communication involves a whiteboard communication. Here, an object, say a document or a scanned picture, is displayed for all participants to view. Each one may edit the object and view the edits and additions being made by others in substantially real time. A further form of real time communication is videoconferencing. As broadcasting speed and quality improve via the Internet, customers are able to contact and see each other online. Customers can speak with Customer service representatives, managers, colleagues.

4) The customer service component within CASA is geared to enhance a host institution's, such as a banking institution's, ability to offer self-directed services to its customers. In keeping with the overall improved quality objectives of its customer service, the CASA component provides customers with an alternative option to inquiries and problem resolution, allows easy and quick access to information, thereby resulting in faster inquiry response, and results in fewer customer service calls.

In an embodiment of the present invention, CASA allows customers to exchange data within their internal systems, both proprietary and commercial (e.g. Treasury workstations, Portfolio Management Systems, Accounting Systems, SAP, Oracle, etc.) FIG. 19 illustrates the plurality of ways a user of services, such as bank services, can access the bank's servers that house the CASA system software in an embodiment of the preset invention. As illustrated, in order to perform banking transactions, the user must access the bank's servers. The user may access the servers via a modem and by directly dialing into the servers. A firewall exists to provide a level of security to prevent unauthorized access. Another method of accessing the system is through a corporate network and its direct connection to the internet via, for example, a T1 line. This provides the user with faster access than with a modem and still gives the individual user access to other software programs available on the corporate servers. For corporations which do not have a T1 line, the corporate server can access the bank's servers via a modem and the Internet. A further method of connecting the user to the bank's servers is via a modem connection to the user's Internet service provider. The connection is completed by accessing the bank's servers via the Internet.

Although the invention has been described with reference to these preferred embodiments, other embodiments can achieve the same results. Variations and modifications of the present invention will be apparent to one skilled in the art and the following claims are intended to cover all such modifications and equivalents.

We claim:

1. A method for providing services over a network from a host to an access location, comprising:
   providing a plurality of services, the plurality of services accessible by the host;
   receiving a request for access to the plurality of services from the access location via the network;
   installing a local access application at the access location; and
   determining whether the local access application at the access location needs to be upgraded;
   wherein the plurality of services are accessible at the access location via the local access application and via the host, and the local access application comprises a plurality of tiers of service access.

2. The method of claim 1, wherein the host comprises a server.

3. The method of claim 1, wherein the plurality of services comprises banking services.

4. The method of claim 1, wherein the access location comprises a customer.

5. The method of claim 1, wherein the host comprises a server at a financial institution.

6. The method of claim 1, wherein the network comprises the internet.

7. The method of claim 1, wherein installing the local access application comprises running an applet at the local access location.

8. The method of claim 1, wherein installing the local access application comprises running the applet at the host.

9. The method of claim 1, wherein the local access location comprises a terminal.

10. The method of claim 1, wherein the local access location comprises a local area network.

11. The method of claim 1, wherein the local access application includes a user interface.

12. The method of claim 1, further comprising:
    identifying a service access tier associated with the local access location;
    determining at least one service associated with the local access location and the service access tier of the local access location; and
    providing access for the local access location to the at least one service associated with the local access location.

13. The method of claim 12, wherein a plurality of users are associated with the local access location, further comprising:
    identifying a user from the plurality of users at the local access location;
    identifying a user service access tier associated with the user;
    determining at least one service associated with the user; and
    providing access for the user to the at least one service.

14. The method of claim 1, further comprising interfacing at least one local client application at the local access location with the local access application.

15. A method for providing services over a network from a host to an access location, comprising:
- providing a plurality of services, the plurality of services accessible by the host;
- receiving a request for access to the plurality of services from the access location via the network;
- installing a local access application at the access location, wherein installing the local access application comprises running an applet at the local access location; and
- determining whether the local access application at the access location needs to be upgraded;
- wherein the plurality of services are accessible at the access location via the local access application and via the host;
- wherein the applet comprises a customizable navigation shell.

16. A system for providing services over a network, comprising:
- a host server coupled to the network;
- a processor accessible by the server, the processor providing a plurality of services;
- an access program operable over the network;
- a local access location coupled to the network;
- an application framework for providing an application for each of the plurality of services over the network; wherein the application framework comprises a navigation shell for providing navigation of available services in the system and an applications object for controlling applications of the available services;
- an entitlements manager for determining whether the service application should be provided by the application framework over the network; and
- a session manager for managing a session of providing the service application over a network;
- wherein the plurality of services are accessible at the access location via a local access application at the local access location and via the host; and wherein the host server determines whether the local access application needs to be upgraded.

17. The system of claim 16, further comprising:
- an event logging manager for processing any error message associated with providing the service application for the network.

18. The system of claim 16, further comprising:
- at least one application utility for assisting the application framework in providing the service application over the network.

19. The system of claim 16, further comprising:
- a reporting framework for providing a report over the network on the provided service application.

20. The system of claim 16, further comprising:
- a security manager for securing the service application over the network.

21. The system of claim 16, further comprising:
- a packaging feature manager for providing an update of the system over the network.

22. A method for providing services over a network from a host to an access location, comprising:
- providing a plurality of services, the plurality of services accessible by the host;
- receiving a request for access to the plurality of services from the access location via the network;
- installing a local access application at the access location;
- determining whether the local access application at the access location needs to be upgraded;
- interfacing at least one local client application at the local access location with the local access application, wherein interfacing comprises translating data from the local access application into a format compatible with at least one service;
- wherein the plurality of services are accessible at the access location via the local access application and via the host.

23. A method for providing services over a network, comprising:
- receiving a request for a service;
- receiving a commitment for the requested service;
- obtaining information relating to the request for the service;
- generating an origination definition function based on the obtained information;
- assigning accessing information to the request for the service;
- creating a profile containing the obtained information;
- providing a software installation package over the network;
- authenticating via the software installation package the request for the service;
- generating a solution package for the requested service; and
- providing the requested service over the network based on the generated solution package.

* * * * *